USO10217020B1

(12) United States Patent
Rivard

(10) Patent No.: US 10,217,020 B1
(45) Date of Patent: Feb. 26, 2019

(54) METHOD AND SYSTEM FOR IDENTIFYING MULTIPLE STRINGS IN AN IMAGE BASED UPON POSITIONS OF MODEL STRINGS RELATIVE TO ONE ANOTHER

(71) Applicant: MATROX ELECTRONIC SYSTEMS LTD., Dorval (CA)

(72) Inventor: Dominique Rivard, Dorval (CA)

(73) Assignee: MATROX ELECTRONIC SYSTEMS LTD., Dorval (CA)

( * ) Notice: Subject to any disclaimer, the term of this patent is extended or adjusted under 35 U.S.C. 154(b) by 74 days.

(21) Appl. No.: 15/383,325

(22) Filed: Dec. 19, 2016

(51) Int. Cl.
*G06K 9/34* (2006.01)
*G06K 9/46* (2006.01)

(52) U.S. Cl.
CPC ....... *G06K 9/4671* (2013.01); *G06K 2209/01* (2013.01)

(58) Field of Classification Search
CPC .. G06K 2209/01; G06K 9/2054; G06K 9/209; G06K 9/325; G06K 9/346; G06K 9/348; G06K 9/6255; G06K 9/64; G06F 17/273
USPC .......................................... 382/176, 309–311
See application file for complete search history.

(56) References Cited

U.S. PATENT DOCUMENTS

| 9,727,804 | B1 * | 8/2017 | Lapointe | ............ G06Q 30/0206 |
| 2003/0028522 | A1 * | 2/2003 | Collins-Thompson | ...................... G06F 17/2715 |
| 2008/0069447 | A1 * | 3/2008 | Hotta | ..................... G06K 9/346 382/182 |
| 2012/0250989 | A1 * | 10/2012 | Asano | ..................... G06K 9/348 382/165 |
| 2013/0080164 | A1 * | 3/2013 | Zanolin | ................. G06F 17/273 704/235 |
| 2014/0012841 | A1 * | 1/2014 | Will | .................. G06F 17/30672 707/728 |
| 2015/0186502 | A1 * | 7/2015 | Kassa | ............... G06F 17/30985 707/723 |
| 2015/0227804 | A1 * | 8/2015 | Kobayashi | ............. G06K 9/209 382/142 |

\* cited by examiner

*Primary Examiner* — Solomon G Bezuayehu
(74) *Attorney, Agent, or Firm* — Nicholson De Vos Webster & Elliott LLP

(57) ABSTRACT

A method and system of identifying a plurality of strings in an image are described. A set of ranks and an image are received. Optical character recognition is performed on the image to identify candidate strings. The candidate strings are ordered according to their location in the image with respect to a reading direction. Minimum assignation costs between the plurality of candidate strings and the set of ranks are determined. Each of the minimum assignation costs is representative of a cost of one or more edit operations performed on the plurality of candidate strings to obtain a subset of candidate strings ordered according to the set of ranks. A subset of candidate strings that is associated with the lowest minimum assignation cost when compared with other minimum assignation costs of other subsets of candidate strings from the plurality of candidate strings is selected and outputting.

27 Claims, 13 Drawing Sheets

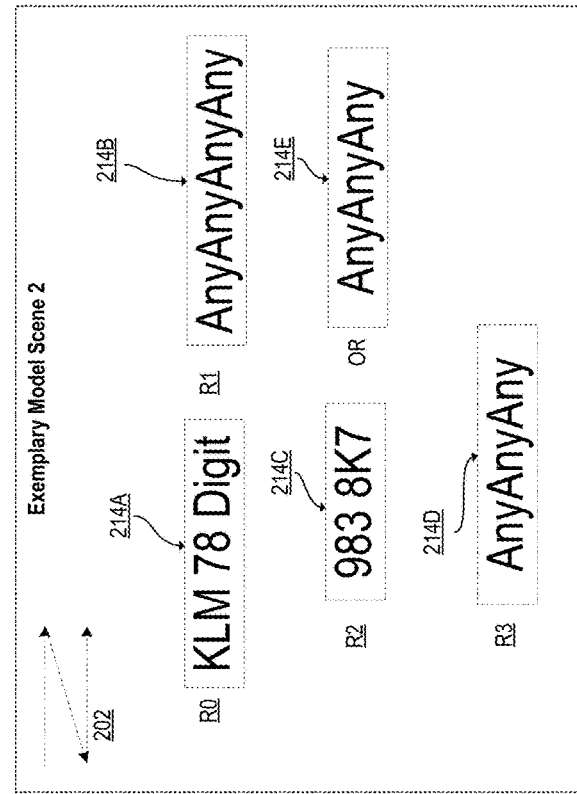
FIGURE 2A
FIGURE 2B
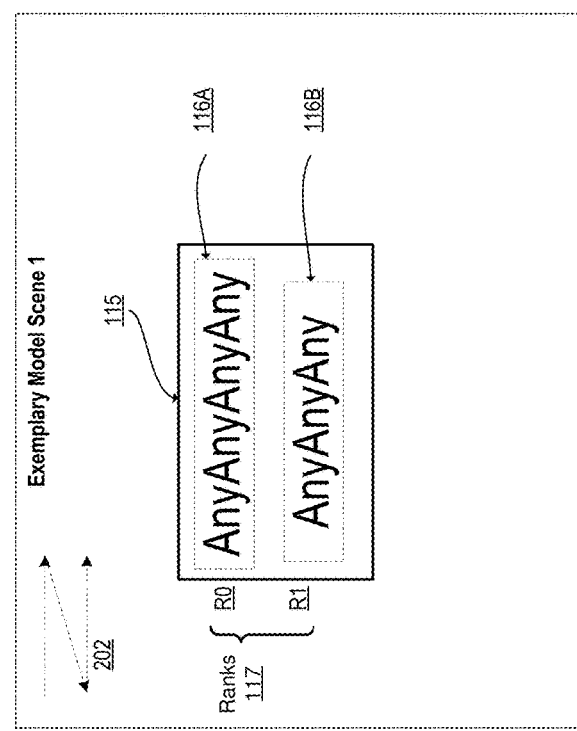
FIGURE 2C

|  | M0 | M1 |
|---|---|---|
| R0 | 1 | 0 |
| R1 | 0 | 1 |

|  | M0 | M1 | M2 | M3 |
|---|---|---|---|---|
| R0 | 0 | 0 | 0 | 1 |
| R1 | 1 | 0 | 0 | 0 |
| R2 | 0 | 1 | 1 | 0 |
| R3 | 0 | 1 | 0 | 0 |

DETERMINE MINIMUM ASSIGNATION COSTS BETWEEN THE PLURALITY OF CANDIDATE STRINGS AND THE SET OF RANKS, WHERE EACH OF THE MINIMUM ASSIGNATION COSTS IS REPRESENTATIVE OF A COST OF ONE OR MORE EDIT OPERATIONS PERFORMED ON THE SET OF CANDIDATE STRINGS TO OBTAIN A SUBSET OF CANDIDATE STRINGS ORDERED ACCORDING TO THE SET OF RANKS
925

DETERMINE A COST OF PERFORMING AN ASSIGN STRING OPERATION ON A FIRST CANDIDATE STRING, WHERE THE ASSIGN STRING OPERATION CAUSES THE FIRST CANDIDATE STRING TO BE ASSIGNED TO A FIRST RANK FROM THE SET OF RANKS AND TO BE INCLUDED IN THE SUBSET OF CANDIDATE STRINGS
940

DETERMINE THAT THE FIRST CANDIDATE STRING DOES NOT OVERLAP WITH A SECOND CANDIDATE STRING FROM THE SUBSET OF CANDIDATE STRINGS
945

DETERMINE THAT THE FIRST RANK IS ASSOCIATED WITH A FIRST MODEL STRING, AND THAT THE CANDIDATE STRING SATISFIES CHARACTERISTICS OF THE FIRST MODEL STRING
950

DETERMINE THAT THE FIRST CANDIDATE STRING FITS WITHIN A BOUNDING BOX DEFINED FOR THE STRING MODELS ASSOCIATED WITH THE SET OF RANKS
955

DETERMINE A COST OF PERFORMING A DELETE STRING OPERATION OF A FIRST CANDIDATE STRING THAT RESULTS IN DISCARDING THE FIRST CANDIDATE STRING FROM THE SUBSET OF CANDIDATE STINGS
960

FIGURE 9B

METHOD AND SYSTEM FOR IDENTIFYING MULTIPLE STRINGS IN AN IMAGE BASED UPON POSITIONS OF MODEL STRINGS RELATIVE TO ONE ANOTHER

FIELD

Embodiments of the invention relate to the field of image processing, and more specifically, to identifying multiple strings in an image based upon positions of model strings relative to one another.

BACKGROUND

Optical Character Recognition (OCR) generally refers is the mechanism of converting images of typed, handwritten or printed text into machine-encoded text (e.g., American Standard Code for Information Interchange (ASCII)), whether from a scanned document, a photo of a document, a scene-photo (e.g., an image acquired from a surveillance camera including a license plate number) or from subtitle text in an image (e.g., closed captioning text). Generally, an OCR mechanism is a computer-implemented process that includes the steps of acquiring an image containing a string of characters to be recognized, recognizing individual characters in the input image as characters of an alphabet, segmenting the characters into one or more strings of characters, performing a string recognition mechanism to return a corresponding output string of characters that corresponds to one or more model strings that are searches in the image (e.g., license plate, serial numbers, postal codes, addresses, etc.).

OCR has a wide range of applications including the recognition of vehicle license plate numbers (e.g., for use in automated traffic law enforcement, surveillance, access control, tolls, etc.), the recognition of serial numbers on parts in an automated manufacturing environment, the recognition of labels on packages (e.g., pharmaceutical packaging, food and beverage packaging, household and personal products packaging, etc.), and various document analysis applications.

Despite sophisticated OCR techniques, OCR errors frequently occur due to the non-ideal conditions of image acquisition, the partial occlusion or degradation of the depicted characters, and especially the structural similarity between certain characters (e.g. Z and 2, 0 and D, 1 and I). For example, the recognition of vehicle license plate numbers must overcome lighting conditions that are both variable (according to the time of day, weather conditions, etc.) and non-uniform (e.g. due to shadows and specular reflection), perspective distortion, and partial occlusion or degradation of the characters (e.g. due to mud, wear of the paint, etc.).

Further the use of OCR in new fields (recognition of vehicle license plate numbers, serial numbers on parts in an automated manufacturing environment, the recognition of labels on packages, etc.) introduces new challenges and complexity as the images analyzed may include a significant amount of noise that need to be filtered in order to extract the relevant text. In particular, the images may include additional texts that can erroneously be identified as the searched text.

BRIEF DESCRIPTION OF THE DRAWINGS

The invention may best be understood by referring to the following description and accompanying drawings that are used to illustrate embodiments of the invention. In the drawings:

FIG. 2A illustrates exemplary model strings that may be defined, in accordance with some embodiments.

FIG. 2B illustrates an exemplary model scene that may be defined, in accordance with some embodiments.

FIG. 2C illustrates an exemplary model scene that may be defined, in accordance with some embodiments.

FIG. 3A illustrates an exemplary matrix representing an association between the model strings and ranks, in accordance with some embodiments.

FIG. 3B illustrates an exemplary matrix representing an association between the model strings and ranks, in accordance with some embodiments.

FIG. 9B illustrates a flow diagram of exemplary operations for determining minimum assignation costs between multiple candidate strings and a set of ranks, in accordance with some embodiments.

DESCRIPTION OF EMBODIMENTS

Figure 1:
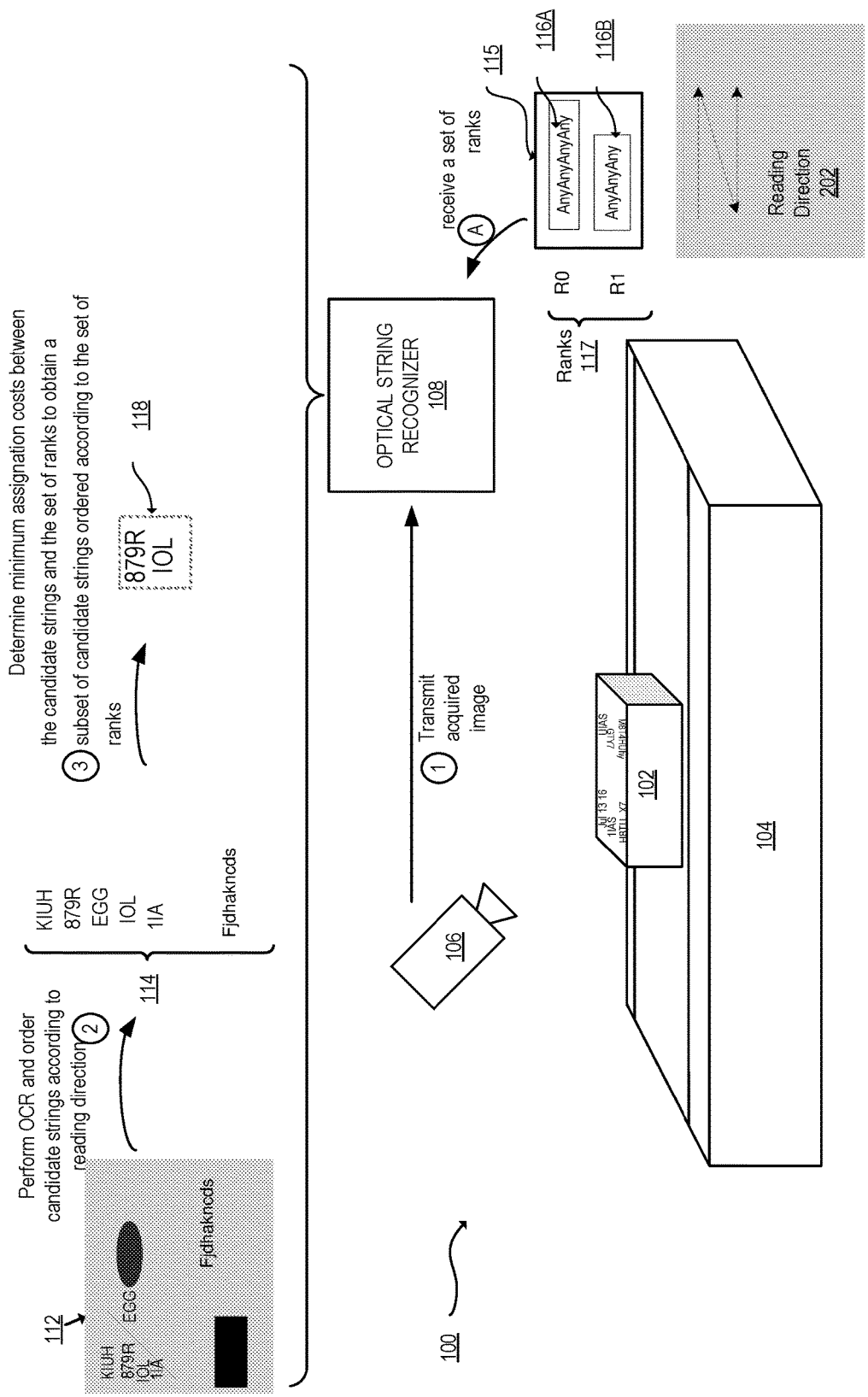
FIG. 1 illustrates a block diagram of an exemplary optical string recognition system 100 in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

OCR has a wide range of applications including the recognition of vehicle license plate numbers (e.g., for use in automated traffic law enforcement, surveillance, access control, tolls, etc.), the recognition of serial numbers on parts in an automated manufacturing environment, the recognition of labels on packages (e.g., pharmaceutical packaging, food and beverage packaging, household and personal products packaging, etc.), and various document analysis applications.

Further the use of OCR in new fields (recognition of vehicle license plate numbers, serial numbers on parts in an automated manufacturing environment, the recognition of labels on packages, etc.) introduces new challenges and complexity as the images analyzed may include a significant amount of noise that need to be filtered in order to extract the relevant text. In particular, the images may include additional texts that can erroneously be identified as the searched text. For example, in a scenario where labels on packages are inspected to verify the proper impression of serial numbers or expiration dates, OCR systems are configured to recognize text strings that follow a template as opposed to a particular predefined sequence of characters. As will be described in further details below, some OCR system define characteristics that a string need to satisfy and may extract in an image all strings that satisfy those characteristics. In a non-limiting example, when the extraction of a serial number is to be performed, an OCR system can be configured to extract a sequence consisting of a number N of characters, where each character is a digit (Digit). In these scenarios, additional text present on the packages (e.g., description of the product, marketing material, etc.) can also have the same format or same characteristics as the template used for the desired serial number. Therefore creating inaccuracies and errors in the identification of the text to be extracted.

The embodiments of the present invention describe methods and systems that enable the accurate identification of multiple strings of characters within an image. A set of ranks is received. Each rank is indicative of a position of a string according to a reading direction. Each one of the ranks is associated with one or more model strings from a set of model strings. An image is acquired. Optical character recognition is performed on the image to identify a plurality of candidate strings. Each one of the candidate strings includes a plurality of candidate characters. The plurality of candidate strings are ordered according to their location in the image with respect to the reading direction. The ordering causes each candidate string to obtain a respective candidate position defined with respect to the reading direction. Minimum assignation costs are determined between the plurality of candidate strings and the set of ranks. Each of the minimum assignation costs is representative of a cost of one or more edit operations performed on the set of candidate strings to obtain a subset of candidate strings ordered according to the set of ranks. A subset of candidate strings that is associated with the lowest minimum assignation cost when compared with other minimum assignation costs of other subsets of candidate strings from the set of candidate strings, is selected. The selected subset of candidate strings is output as the result of the identification of the strings in the image.

FIG. 1 illustrates a block diagram of an exemplary optical string recognition system 100 in accordance with some embodiments. The system 100 includes an image acquisition device 106 (such as a digital camera) that is operative to acquire one or more images of an object 102 in a scene. For example, the object 102 may be a product on a conveyor system 104 of a manufacture. The image is transmitted to the optical string recognizer 108 to be analyzed. The optical string recognizer 108 is operative to read and recognize text from the acquired image.

The optical string recognizer 108 is implemented on an electronic device according to various embodiments as will be described in further details with reference to FIG. 10. While FIG. 1 illustrates a scene of a product inspection scenario in a manufacturing environment, the embodiments of the present invention are not limited to these types of use cases. For example, the invention can be used to recognize and read text in images from natural scenes, printed material or a sequence of images (e.g., pictures from a video stream). For example, optical string recognition can be performed to identify valid strings that are not words but strings satisfying a "template" of some sort; such strings include vehicle license plate numbers, serial numbers, ID numbers, ZIP codes, etc. The optical string recognizer 108 recognizes text in an image by matching candidate strings that are extracted from the image with one or more model strings defined in a set-up stage (operation (A)). The results of this mechanism are output strings which correspond to candidate strings that may have been modified in order to satisfy the characteristics of the model strings, where the output strings are displayed in the same order as the model strings.

At operation (A) a set of ranks 117 and model strings 116A and 116B are received. The model strings may be defined in various manners. FIG. 2A illustrates exemplary model strings that may be defined, in accordance with some embodiments. In one embodiment, a model string is defined as a sequence of predefined characters and spaces from a given alphabet (e.g., the user may be interested in identifying the following sequences of characters "983 8K7," as illustrated in FIG. 2A (model string M2), or any other set of successive predefined characters). One possible alphabet is the set of characters A-Z and numerals 0-9, though other alphabets can also be used. In some embodiments, an output string S satisfies a model string if the output string and the model string are of the same length and if each character of the output string is the same as the character at the corresponding character position in the model string.

Alternatively in some embodiments, the model string may be a template for an output string as opposed to successive predefined characters. In an embodiment, a template T for an output string has multiple character positions, each character position j being associated with a character set Cj. Thus, template T can be represented as a sequence of N character sets Cj:

T=C1C2 . . . $C_N$

Each character set Cj consists of a set of allowable characters for the respective character position j in the output string, where this set of allowable characters is for example a subset of an alphabet. One possible alphabet is the set of characters A-Z (that is referred to herein as the set of letter (Letters)) and numerals 0-9 (that is referred to herein as the set of digits (Digits)), though other alphabets can also be used. A character set can consist of a single character of an alphabet, several characters of an alphabet, or all characters of an alphabet. According to this embodiment, a string S preferably satisfies a template T if the string and the template are of the same length and if each character of the string belongs to the character set at the corresponding character position in the template. A model string with a sequence of predefined characters is a template T, where each character position j is associated with a single character (e.g., model string M2 of FIG. 2A). Alternatively when each character position j is associated with more than one character from an alphabet, the model string can be defined based on the type of characters at that position (e.g., a digit "Digit", a letter "Letter", or any of a digit or letter "Any"). For example, model string M0 includes four character positions and each position may include a character of type any (Any) (e.g., it can be a digit or a letter). Similarly model string M1 includes three character positions and each position may include a character of type any (Any). In contrast model string M3 includes six character positions, where the first five character positions are defined characters "KLM 78" and the last position is a digit (Digit).

While in the preceding embodiment, a template was described as having a fixed length N. In a variant embodiment, a template may consist of a sequence of character sets Cj of variable length. The template may have a minimum length $L_{min}$ and a maximum length $L_{max}$, and a character set Cj is defined for each position j in the template in the range [1,$L_{max}$]:

T=$C_1C_2$ . . . $CL_{min}$ . . . $CL_{max}$

According to this variant embodiment, a string S preferably satisfies a template T if the length of the string belongs to the range [$L_{min}$, $L_{max}$] defined by the minimum and maximum lengths of the template and if each character of the string belongs to the character set at the corresponding character position in the template.

Note that the minimum length $L_{min}$ and the maximum length $L_{max}$ need not be constant values. In one embodiment, the maximum length $L_{max}$ is defined as a function of the length N of the candidate string, for example using the relation $L_{max}$=N+X where X is a constant value.

In some embodiments, the operations of defining the model strings are performed during a set-up or pre-processing stage. In addition to the definition of the model strings, the set-up stage can include the definition of other selection criteria for the strings to locate in an image (for example, a number of strings to be located, positions of the strings relative to one another, positions of the strings in the image, the font of characters that form the model strings, or a region of interest or bounding box within which the sequence of strings needs to be located, etc.). In some embodiments, the parameters and selection criteria for defining the strings to be located in an image can be entered by a user through a graphical user interface (GUI). The user can be prompted to define the model strings, a set of ranks, and any other information for defining the strings to be located in an image. In some embodiments, the user may be prompted to enter one or more model string for each rank by typing the characters on a keyboard or selecting a set of characters through a drop down menu. In other embodiments, the user may input an image (similar to model scene 1). In some embodiments, instead of being input to the optical string recognizer by a user, the parameters can be preconfigured (e.g., hardcoded) in the optical string recognizer 108.

In one embodiment, a number of output strings to be read in an image, a set of ranks R (e.g., 117 (R0, R1)), and optionally a bounding box including the output string are defined. FIG. 2B illustrates an exemplary model scene that may be defined in an optical string recognizer, in accordance with some embodiments. In model scene 1, a sequence of two strings (116A and 116B) is defined. The scene includes a first rank R0 and a second rank R1. Each rank indicates the location of a string with respect to the other string of the sequence, in accordance with a reading direction. In the exemplary embodiments described herein the reading direction (e.g., reading direction 202) represents the direction in which the image is scanned for reading the strings. In a non-limiting example, the reading direction 202 is from left to right and from top to bottom. In other embodiments, other reading directions may be defined without departing from the scope of the present invention.

Thus, referring back to model scene 1, R0 is associated with a model string M0 and the R1 is associated with the model string M1. In some embodiments, this association can be represented with a matrix as illustrated with matrix 302A of FIG. 3A. As will be described in further details below, the matrix will be used during the operations of determining assignation costs between candidate strings and model strings. While the embodiments are described with the association between the ranks and the model strings being represented as a matrix, other types of data representation and association can be used without departing from the scope of the present invention. The information presented with matrix 302A indicates that in a sequence of strings ordered from left to right and from top to bottom, the first string (i.e., located at rank R0) satisfies the characteristics of model string M0, and the second string (i.e., located at rank R1) satisfies the characteristics of model string M1.

In some embodiments, in addition to the ranks and the model strings associated for each rank, a bounding box may further be defined (e.g., bounding box 115). A bounding box limits the size of a region in which the strings are to be located. While the embodiments will be described with a rectangular bounding box, other shapes can be considered (e.g., circle, ellipse, etc.). In the illustrated examples of FIGS. 1 and 2B, a rectangular bounding box 115 is defined.

FIG. 2C illustrates another exemplary model scene that may be defined, in accordance with some embodiments. In the exemplary model scene 2, four model strings are defined (M0, M1, M2, and M3), and four ranks. In other words the strings to be located are a first model string of type M3, followed with a second model string of type M0, followed with a third model string of type M2 or of type M1 and a last model string of type M0. While in the example of model scene 1, each rank was defined on a separate line in an image, model scene 2 illustrates an example where two ranks may be defined on a same line within an image. In addition, two ranks (R1 and R3) are associated with the same model string. Further, the rank R2 may be assigned to two model strings M1 and M2. In other words, at the rank R2, any one of the model strings M1 and M2 can be detected. In model scene 2, no bounding box is defined. FIG. 3B illustrates an exemplary matrix 302B representing an association between the model strings (M0, M1, M2, and M3) and ranks (R0, R1, R2, and R3), in accordance with some embodiments. The matrix 302B represents the association between the ranks and the model strings of model scene 2 of FIG. 2C. According to the matrix 302B, rank R0 is associated with model string M3, rank R1 is associated with model string M0, rank R2 is associated with model string M1 or with model string M2, and rank R3 is associated with model string M0.

While the embodiments, will be described below with exemplary model scene 1, various string models and model scenes can be defined without departing from the scope of the present invention. For example, while the embodiments of model scene 1 are described with each rank being associated with a single model string, in other embodiments, a rank may be associated with more than one model strings. For example, two or more model strings may be defined for a rank indicating that one of the many defined model strings can be located at that position. In addition, a model string can be associated with any number of ranks without departing from the scope of the present invention.

Referring back to FIG. 1, at operation (1), an image is transmitted to the optical string recognizer 108 to be processed. The image can be a grayscale image (e.g., image 112), in which each pixel of the image has an intensity value within a given range (e.g., between 0 and 255 when the pixel intensity is represented with 8 bits; between 0 and 65335 when the pixel intensity is represented with 16 bits; or other ranges when the pixel intensity is represented with a different number of bits). An intensity value of 0 indicates a black pixel while the maximum value (e.g., 255, 65535 or other) indicates a white pixel, any other value within the minimum and the maximum value is a shade of grey. While image 112 appears to include white pixels, black pixels and grey pixels of a single shade of grey, other input images will typically include pixels with varying shades of grey. In some embodiments, the acquired image can be a color image (e.g., RGB). When the image is a color image, the optical string recognizer may be operative to convert the image into a grayscale image.

Referring back to FIG. 1, when the image is acquired, at operation (2), the optical string recognizer 108 performs optical character recognition on the acquired image 112 to identify candidate strings of characters (e.g., strings 114) and order the strings according to a reading direction (e.g., reading direction 202). At operation (3) the optical string recognizer 108 determines minimum assignation costs between the candidate strings and the set of ranks to obtain a subset of candidate strings ordered according to the set of ranks, and selects a subset of candidate strings 118 that is associated with the lowest minimum assignation cost when compared with other minimum assignation costs of other subsets of candidate strings from the set of candidate strings.

Figure 4:
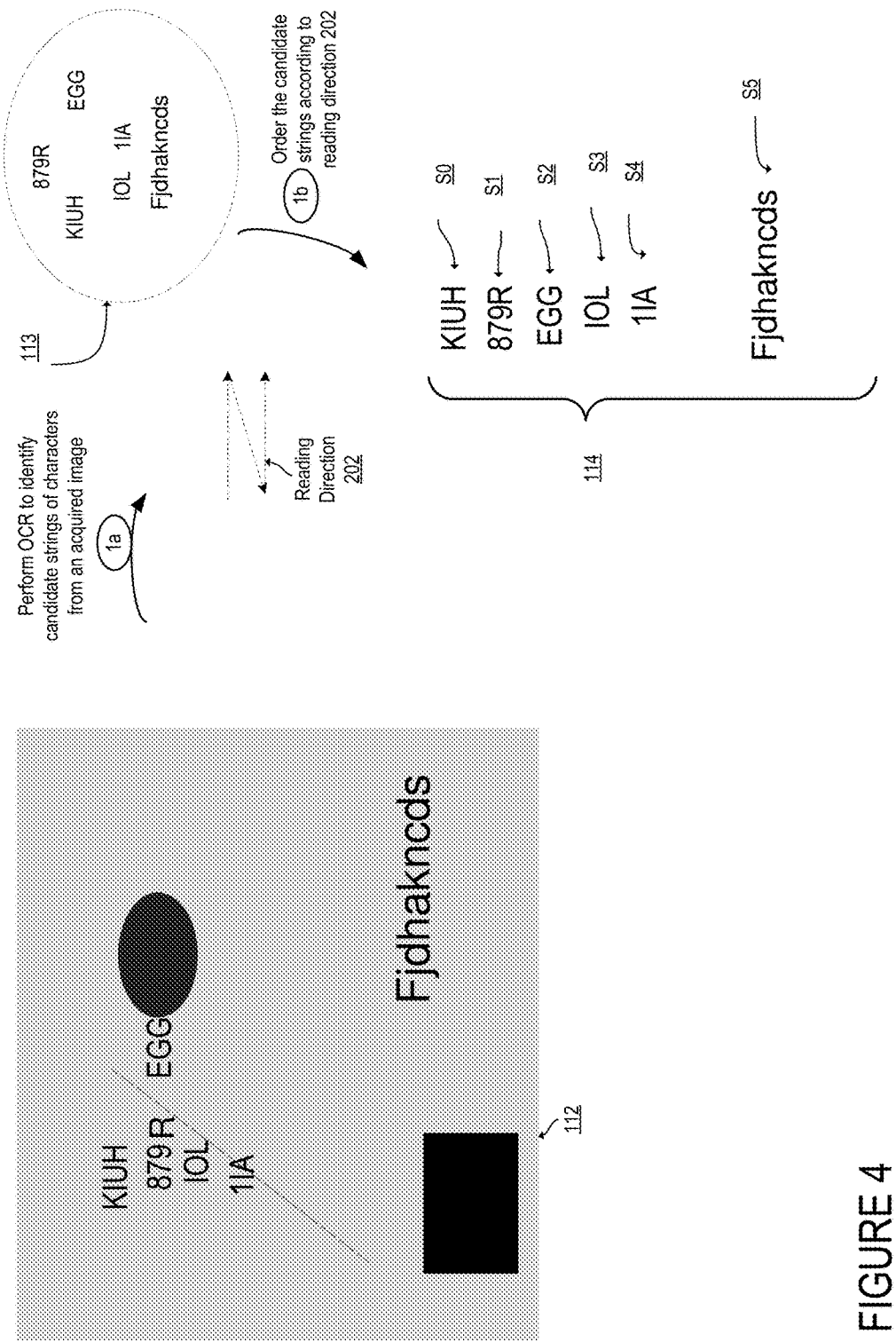
FIG. 4 illustrates exemplary operations for extracting candidate strings from an image, in accordance with some embodiments.

FIG. 4 illustrates exemplary operations for extracting candidate strings from an image, in accordance with some embodiments. Image 112 is received by the optical string recognizer (OSR) 108 to be analyzed. OSR 108 analyzed the image 112 to identify output strings that match the characteristics of the model scene 1. At operation (1a), OSR 108 performs optical character recognition and extracts the strings 113. OCR can be performed according to various techniques. Typically a first step of extracting candidate characters that match model characters is performed, followed with a second step of segmenting the candidate characters into multiple strings.

In various embodiments, at the stage of extraction of the candidate characters, each identified candidate character is a potential match in the image for a character model. Each candidate character has associated information such as a reference to the particular character model that was matched, a position in the target image where the particular model character was matched, and a recognition score associated with the OCR process. For example, a position may consist of the coordinates (x,y) of a pixel where x,y may be integer or non-integer values (providing for sub-pixel accuracy).

In some embodiments, the OCR performed on the image 112 identifies a candidate character, if any, that "match" a respective character model by determining a recognition score between the model character and the candidate character. In such embodiments, a recognition score may be a measure indicative of a degree of similarity between the candidate character and the model character. In a specific, non-limiting example of implementation, the OCR process applies matrix matching to compare character models (defined in respective model images) on a pixel-by-pixel basis (i.e. "pattern matching" or "pattern recognition" or "image correlation") and uses a normalized correlation algorithm to determine recognition scores between characters identified in the image 112 and the defined character models. Note however that different types of OCR processes and algorithms exist and may be used to identify candidate characters in an image and/or to determine recognition scores, without departing from the scope of the present invention.

In some embodiments, a recognition score is determined by comparing values of pixels in the image with values of pixels in a model image including the model characters, for example, using normalized grayscale correlation. In other embodiments, a recognition score is determined by extracting a set of features from the model, extracting a similar set of features from the acquired image, and then determining associations between the model and feature sets of the acquired image. For example, the set of features can be the coordinates of edge points, interest points or other local features, and determining associations can be performed using a geometric hashing, Hough transform, or generalized Hough transform technique. In other embodiments, a recognition score is determined by extracting a feature vector from the acquired image and model image, respectively, and then determining a score (e.g., based on a Euclidean distance) between the acquired and model feature vectors.

In some embodiments, an OCR process based on artificial intelligence can be employed. In this case, a recognition score may be a measure of the likelihood that a portion of the image corresponds to a particular character model determined based on samples provided for the character model during a training stage.

Note that various techniques exist and may be used for establishing recognition scores between character models and characters in an image. Furthermore, the assessed recognitions scores for the image may be manipulated in different, known ways to ascertain whether or not matches have been identified between character models and the image. In one example, the OCR process may define a match between a certain character in the image and the model image of a particular character model if the determined recognition score therebetween is greater than a predefined threshold, in which case that certain character is identified as a candidate character in the target image. In another embodiment, all matches are returned as candidate characters regardless of their recognition scores.

When a candidate character (C) is extracted from the image 112, it is associated with a respective position (x, y) within the image and a respective recognition score (RS). A segmentation operations is then performed to group and segment the candidate characters into candidate strings that include a set of one or more candidate characters. In some embodiments, the identification of the candidate strings is performed by determining whether a sequence of candidate characters, when grouped, satisfies a stringness criteria. In a specific, non-limiting example of implementation, the stringness criteria include an alignment criterion and an inter-character spacing criterion. For example, with reference to FIG. 4, each one of the extracted candidate strings 113 satisfies the following criteria: the sequence of candidate characters within a string are substantially aligned, the distance between two consecutive characters of a candidate string is within a tolerable threshold distance.

Once the candidate strings 113 are extracted, the OSR 108 orders the strings according to a reading direction 202. The reading order is the same as the one used for defining the ranks and the characteristics of model scene 1. In some embodiments, when the candidate strings are extracted they are already ordered in the reading order 202 as the image 112 may be processed in that order and this ordering operation can be skipped. In other embodiments an additional operation can be performed to order the candidate strings resulting in the ordered candidate strings 114 (S0-S5).

Each one of the strings 114 is then analyzed to determine if it satisfies the characteristics of one or more model strings. For example, for each strings $S_i$, a similarity measure can be calculated between a candidate string and each one of the model strings. The similarity measure is an indication of the similarities or alternatively of the disparities between the two strings. In some embodiments, a minimum edit cost (e.g., an edit distance, a Levensthein distance, weighed edit distance, or any other type of distance that computes the differences between two strings) for transforming a candidate string into each one of the model strings M0, M1 is computed. In some embodiments, determining a minimum edit cost of transforming the candidate string to satisfy a model string includes determining "set costs" of performing various sets (or combinations) of edit operations (e.g., deletions, insertions, and substitutions or a subset of these operations) on the candidate string and determining a minimum cost among the set costs. In some embodiments, determining a minimum edit cost is performed according to a dynamic programming algorithm. One of ordinary skill in the art would recognize that several techniques are known for providing a similarity measure (e.g., a minimum edit cost) between two strings and any of these techniques applies in the embodiments described herein without departing from the scope of the present invention.

In some embodiments, once the minimum edit cost of transforming a candidate string into a model string is computed, an output string corresponding to the determined minimum edit cost is returned. In some embodiments, this is performed by determining a set of edit operations corresponding to the minimum edit cost, performing the set of edit operations (if any) on the candidate string to obtain a revised candidate string, and returning an output string corresponding to the revised candidate string. In some embodiments, based on the respective minimum edit costs a subset of the candidate strings 114 can be discarded. For example, a candidate string can be discarded when it is determined that the minimum edit cost between the candidate string and any of the model string is a high number that falls outside of an acceptable range for the minimum edit cost. In the illustrated example S5 is discarded. One of ordinary skill in the art would recognize that in order to transform S5 into one of the model strings M0 or M1, a significant number of delete operations would be performed consequently resulting in a high minimum edit cost for each one of the pairs (S5, M0) and (S5, M1). Therefore S5 is discarded. In another example, a candidate string can be discarded when it is determined that there is no set of operations that can transform the candidate string into any one of the model strings.

Figure 5:
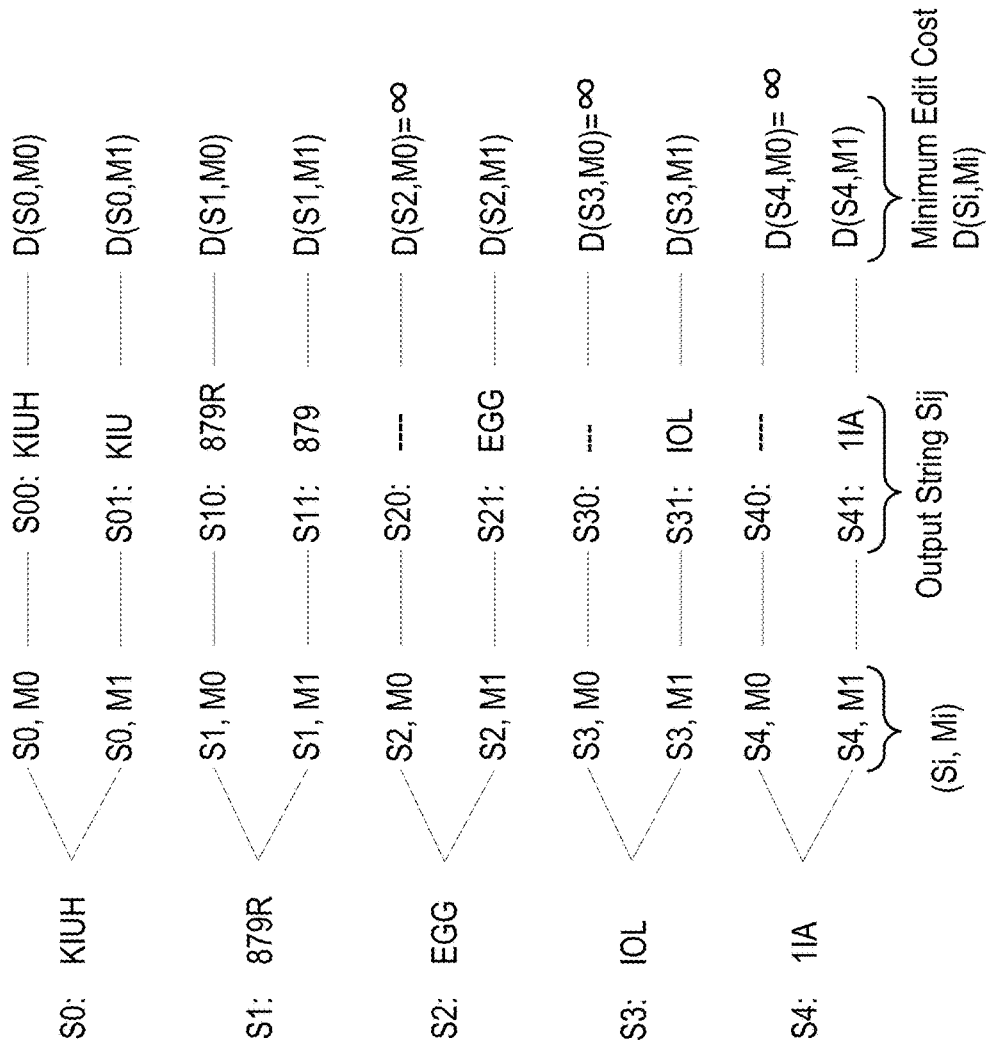
FIG. 5 illustrates exemplary minimum edit costs $D(S_i, M_i)$ and output strings $S_{ij}$ identified for candidate string model string pair $(S_i, M_i)$, in accordance with some embodiments.

FIG. 5 illustrates exemplary minimum edit costs D(Si, Mi) and output strings Sij identified for a candidate string-model string pair (Si, Mi), in accordance with some embodiments. For each pair (Si, Mi) a minimum edit cost D(Si, Mi) is determined and an output string Sij is obtained. The output string is the candidate string as modified with edit operations to satisfy the characteristics of the model string. For example, the output string S01 ("KIU") results from a delete operation performed on the candidate string S0 ("KIUH") to satisfy the characteristic of model string S1 ("AnyAnyAny"). While in this example the letter "H" is deleted from the string S0 ("KIUH") in order to satisfy the characteristics of the model string M1 ("AnyAnyAny") one would understand that this is exemplary only and other modifications (e.g., deletion of other characters) can be made to string S0 in order to satisfy the characteristics of the model string M1.

In some embodiments, and as shown in FIG. 5, some pairs (Si, Mi) do not yield an output string and the associated minimum edit cost is determined to be a "not defined" value, such as a high value clearly outside the normal range for an edit cost (e.g., infinity). When a minimum edit cost between a candidate string Si and a model string Mi is not defined, it indicates that the minimum edit cost cannot converge to a value within an acceptable range and that the candidate string cannot be transformed into an output string that satisfies the characteristics of the model string. For example, in some embodiments, performing an insert operation (i.e., inserting a character in a candidate string in order to obtain an output string that satisfies the characteristics of a model string) is not allowed in the calculation of the minimum edit cost. Therefore, in these embodiments, when a candidate string includes less characters than a model string (e.g., S2, S3, and S4 with respect to model string M0), it is determined that the candidate string cannot be transformed (given that the insert operation is not allowed) to satisfy the characteristics of the model string and the minimum edit cost is determined to be not defined.

Thus, the OSR 108 determines an association between each of the candidate strings S0-S4 and the model strings M0-M1 that includes determining an output string Sij (S00-S41) (i.e., a modified candidate string which satisfies the characteristics of a model string) and a corresponding minimum edit cost for each pair (Sij). The minimum edit cost being an indication of the difference between a candidate string and a model string. In some embodiments, the minimum edit cost between a candidate string and a model string is computed based on recognition scores determined for the candidate strings during the OCR process. While the embodiments, are described with reference to minimum edit cost computed between candidate strings and model strings, in other embodiments other measures/distances can be used to determine the similarities or alternatively the differences between each candidate string and a respective model string without departing from the scope of the current invention.

In some embodiments, the OSR 108 determines whether the output strings (Sij) are compatible with one another. In other words, the OSR 108 determines for each output string Sij, if it overlaps with any of the other output strings. In some embodiments, an output string is determined to overlap with another if they share a character. When an output string Sij is determined to overlap (i.e., share a character)

with another output string, it is determined that the two strings are not compatible. Each output string Sij includes a set of characters, and each character within the string has a position (x,y) within the image 112, at least one label associated with it and a recognition score associated with the label. Two output strings share a character when a character at a position (x,y) in the image belongs to the two output strings simultaneously. In the illustrated example of image 112 none of the output strings S00-S41 share characters with another one of the output strings, therefore it is determined that the various output strings are compatible with one another.

Figure 6:
FIG. 6 illustrates an exemplary matrix representing the compatibilities between output strings within an image 112 in accordance with some embodiments.

In some embodiments, the compatibility between the different output strings is expressed as the matrix 600. FIG. 6 illustrates an exemplary matrix representing the compatibilities between output strings within an image 112 in accordance with some embodiments. Each row in the matrix 600 represents an output string Sij with a corresponding model string Mj. Similarly each column in the matrix 600 represents an output string Sij with a corresponding model string Mi. A cell (Sij, Smn) includes a 0 or 1 depending on whether the output strings Sij and Smn overlap or not. For example, an output string Sij overlaps with itself therefore a cell (Sij, Smn) includes a "0". In the example of image 112, each one of the output strings Sij does not overlap with other output strings, therefore the cells (Sij, Smn) when ism includes a "1". While the embodiments are discussed with respect to the matrix 600 illustrating the compatibility within the image 112 of the candidate strings other data structures or mechanisms can be used for determining their compatibility. For example, the compatibility of two output strings can be determined on the fly at the time of calculation of the assignation cost (as will be discussed in further details below). Alternatively, this determination can be performed during a pre-processing stage of the image 112 for all the pairs (Sij,Smn).

Figure 7:
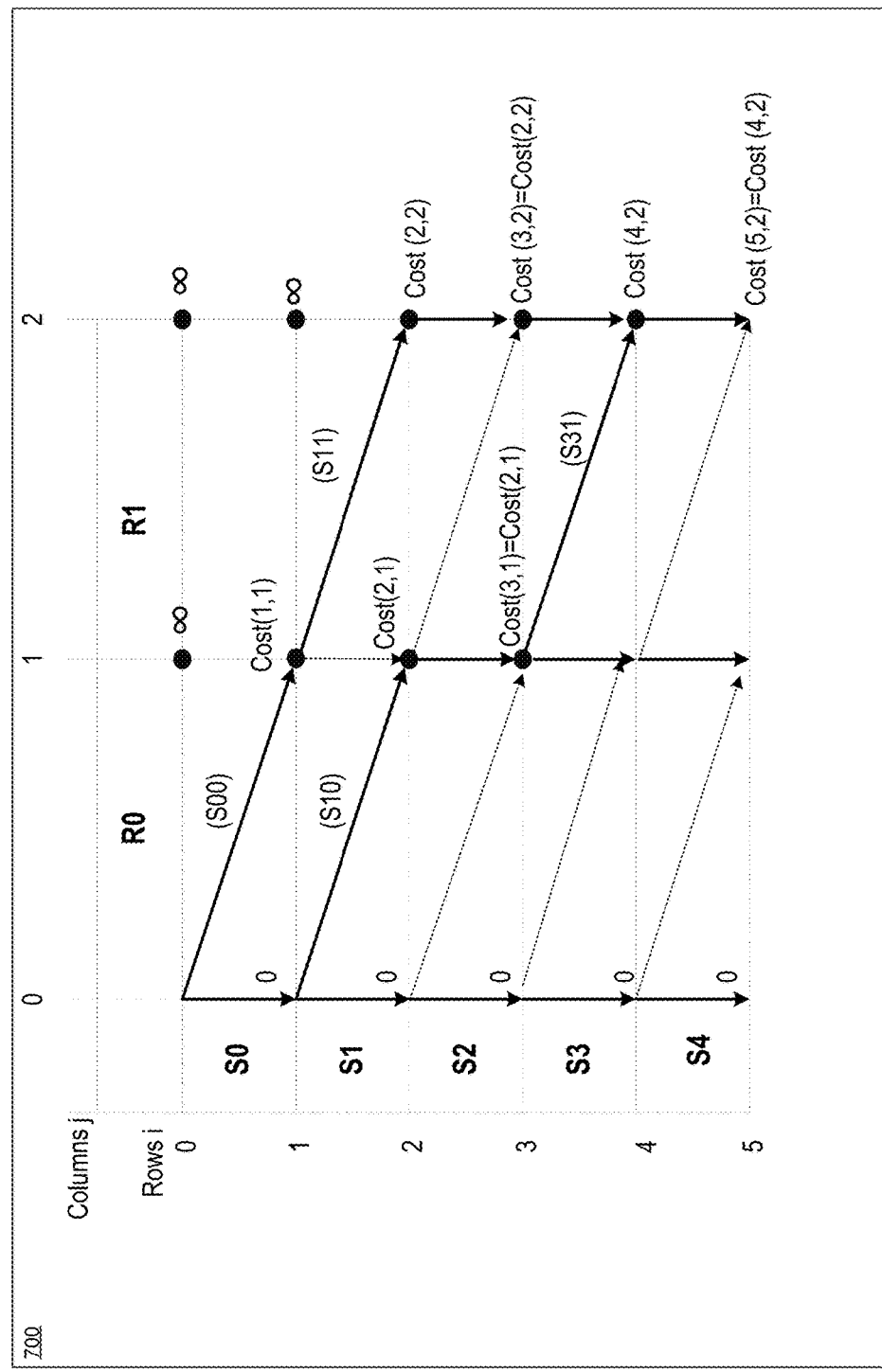
FIG. 7 illustrates an exemplary computation of a minimum assignation cost between the candidate strings and the set of ranks, in accordance with some embodiments.

FIG. 7 illustrates an exemplary computation of a minimum assignation cost between the candidate strings and the set of ranks, in accordance with some embodiments. When the candidate strings are extracted from the image 112, they are ordered in according to the reading direction 202. A dynamic programming process is used to assign each one of the candidate strings Si to a corresponding rank from the set of ranks Ri. This assignation is performed based on information extracted from the image (e.g., overlap of output strings, minimum edit costs of respective candidate strings, positions of the strings within the image, order of the candidate strings within the image, etc.) as well as information input to the OSR 108 at the set-up stage (e.g., association between the ranks and the model strings, bounding box, etc.).

In some embodiments, the dynamic programming process is performed according to dynamic operations between cells of a dynamic programming array 700. While the embodiments below will be described with reference to the exemplary image 112, the candidate strings S0-S4 and the ranks R0-R1, one or ordinary skill in the art would understand that this scenario is intended to be exemplary only and other scenarios can be contemplated without departing from the scope of the present invention. For example, any number of ranks may be defined in a scene, as well as any number of candidate strings can be detected in an image resulting in dynamic programming arrays of various size N×M without departing from the scope of the invention.

Referring back to FIG. 7, to determine the minimum assignation cost between the candidate strings S0-S4 and the ranks R0-R1, each cell (row i, column j) of the dynamic programming array 700 is processed in turn, proceeding generally from the top-left cell (0,0) to the bottom-right cell (5,2). To proceed from a given cell (i, j) to another cell (m, n), an operation is performed on the string Si relative to the rank Rj and a cost is determined for the operation. A set of allowable operations is defined to advance from a first cell to an adjacent cell within the dynamic programming array 700. An assign string operation is defined for proceeding from a cell (i,j) towards a diagonally adjacent cell (i+1, j+1). The assign string operation is applied to a candidate string Si and results in assigning the candidate string Si to the rank Rj. Additionally a delete string operation is defined for proceeding from a cell (i, j+1) to the bottom adjacent cell (i+1, j+1). The delete string operation is applied to a candidate string $S_{i+1}$ and results in discarding the candidate string $S_{i+1}$ from a set of selected candidate strings that are assigned with ranks. Therefore, in contrast to the assign string operation, the delete string operation does not result in the assignation of a candidate string $S_{i+1}$ to a rank $R_{j+1}$.

Each one of the assign string and the delete string operations is associated with a respective operation cost. At each cell (i+1,j+1) a cost Cost(i+1,j+1) is calculated. Cost(i+1,j+1) is a minimum assignation cost at cell (i+1,j+1) and it is determined as the minimum cost among the costs determined for reaching the cell (i+1,j+1) by performing a keep string operation or a delete string operation. When an assign string operation is performed for advancing from cell (i,j) to cell (i+1, j+1), the $Cost_{assign}(Si \rightarrow Rj)$ is calculated. $Cost_{assign}(Si \rightarrow Rj)$ represents the cost of s assigning the string Si to the rank Rj. In some embodiments, $Cost_{assign}(Si \rightarrow Rj)$ is determined based on the minimum edit cost associated with the string Si. As will be described in further details below with reference to processing performed in the dynamic programming array 700, the $Cost_{assign}(Si \rightarrow Rj)$ is the minimum over a set of models $M_k$ that can be located at the rank Rj of the minimum edit cost $(Si, M_k)$. The cost of reaching the cell (i+1, j+1) through an assign operation is the sum of Cost(i, j)+$Cost_{assign}(Si \rightarrow Rj)$.

While in the example discussed herein, each rank is associated with a single model strings, in other embodiments, a rank may be associated with more than one model strings (e.g., referring back to FIG. 3B, rank R2 is associated with model M1 and model M1). In these embodiments, when an assign string operation is performed and cost for assigning the string is calculated, the cost of assigning a candidate string to the rank is based on the model strings that yields the minimum assignation costs for the candidate strings among all the model strings associated with the rank.

In some embodiments, in order to advance from a cell (i,j) to the diagonally adjacent cell (i+1,j+1) with the assign string operation, the OSR 108 further determines whether the operation is valid operation and can be performed based on one or more multiple criteria. For example, the OSR 108 may determine that the candidate string satisfies characteristics of at least one model string that is associated with the rank j. Further the OSR 108 may determine that the candidate string Si does not overlap with another candidate string from the set of candidate string that are already assigned to the ranks (i.e., that were already selected). In addition, in some embodiments, the OSR 108 may determine whether the candidate string Si fits within a bounding box defined for the string models. In other embodiments additional criteria can be used to determine whether the candidate string can be assigned to a rank Rj and the assign operation can be performed. In some embodiments, when it is determined that the string Si does not satisfy at least one of the selection criteria, the assign string operation is an invalid operation and the cost of assigning the string Si to the rank Rj is set to be not defined (e.g., it can be set to a very high value (e.g., infinity) clearly indicating that the assign operation is not valid).

When a delete string operation is performed for advancing from cell (i,j+1) to cell (i+1, j+1), a cost of moving from cell (i,j+1) to cell (i+1, j+1) with a delete operation is calculated. This cost is the sum of Cost(i,j+1)+Cost$_{delete}$(Si). Cost$_{delete}$(Si) represents the cost of discarding the string Si from the set of selected candidate strings and consequently of not assigning the string Si to the rank R$_{j+1}$. In some embodiments, Cost$_{delete}$(Si) is determined to be zero when R$_{j+1}$ is the initial rank or alternatively when the j+1 is the last column of the dynamic programming array. Otherwise Cost$_{delete}$(Si) is 1−Cost$_{assign}$(Si→(j+1)). Consequently when Cost$_{assign}$(Si→(j+1)) is infinite, the Cost$_{delete}$(%)=0.

In the dynamic programming array 700, proceeding from a cell (i+1, j) to cell (i+1, j+1) is defined to be an invalid operation, therefore in some embodiments the cost of moving from cell (i+1, j) to cell (i+1, j+1) is determined to be not defined and is set to a high value. Finally, at each cell (i+1,j+1), a minimum assignation cost Cost (i+1,j+1) is calculated as the minimum cost among the edit costs determined for reaching the cell (i+1,j+1) by performing a keep string operation or a delete string operation. Therefore, in general, Cost(i+1,j+1)=Min (Cost(i,j)+Cost$_{assign}$(Si→Rj); Cost(i,j+1)+Cost$_{delete}$(S$_{i+1}$)).

The operations of the dynamic programming array 700 will now be described in further details. The process is initiated at cell (0,0) where no string Si has yet been assigned to a rank Rj. The strings S0-S4 are ordered in accordance to the reading direction 202, such that string S0 ("KIUH") is read first, followed with string S1 ("879R"), followed with string S2 ("EGG"), followed with string S3 ("IOL"), which is followed by the last string S4 ("HA"). The dynamic programming array is traversed in order to determine assignation costs for assigning a subset of strings to the ranks S0-S1. The array 700 is traversed by performing one of the two operations as defined above, an assign string or a delete string. The array 700, the cells (0,1), (0,2), and (1,2) are determined to have infinite associated minimum assignation costs as there is no valid operation that can lead to one of these cells when originating from (0,0).

Initiating the process at (0,0), the OSR 108 determines whether an assign string operation can be performed in order to proceed to cell (1,1). The OSR 108 determines if there is an output string S0k (associated with the candidate string S0) that satisfies characteristics of a model string associated with the rank R0. Referring back to FIG. 5, S0 has two potential output strings S00 and S01. The output string S00 represents a modified candidate string S0 that satisfies the characteristics of model M0. Similarly the output string S01 represents a modified candidate string S0 that satisfies the characteristics of model string M1. Referring back to FIG. 3A, which represents the association of the model strings and the ranks, it is determined that the rank R0 is only associated with the model M0. Therefore, only an output string that satisfies the characteristics of model M0 can be assigned to rank R0. Therefore combining the information of FIG. 3A and FIG. 5, OSR 108 determines that there is an output string S00 (associated with model M0) that can be assigned to the rank R0, in other words that the string S00 can be added to a subset of selected output strings assigned to ranks. The path (0,0)→(1,1) is possible and a cost of proceeding from cell (0,0) to cell (1,1) with an assign string operation can be calculated. Given that the assignation of string S0 to rank R0 is the first operation performed on the set of candidate strings S0-S4, the cost of moving from cell (0,0) to cell (1,1) with an assign string operation is Cost$_{assign}$(S0→R0). In some embodiments, the Cost$_{assign}$(S0→R0) is determined based on the minimum edit cost between S0 and M0. For example, Cost$_{assign}$(S0→R0) D(S0,M0), where D(S0,M0) is the minimum edit cost of transforming S0 into output string S00 to satisfy the characteristics of model M0.

In some embodiments, in addition to determining that there is an output string S0k that satisfies the characteristics of a model string that is associated with rank R0, the OSR 108 may further determine whether the candidate string S0 overlaps or not with another candidate string from the set of candidate string that are already assigned to the ranks prior to performing the assign string operation. In this example, string S0 is the first string to be assigned to a rank R0 and therefore there is no other string in the selected set of strings. In addition, in some embodiments, the OSR 108 may determine if the candidate string S0 fits within a bounding box defined for the string models associated with the set of ranks. Given that string S0 satisfies all the selection criteria for the strings, the assign string operation is determined to be valid and the cost of this operations is Cost$_{assign}$(S0→R0)=D(S0,M0).

At cell (1,1), OSR 108 determines the minimum assignation cost Cost(1,1). Cost (1,1) is the minimum between the costs of performing an assign operation (providing from cell (0,0) and the cost of a delete operation providing from cell (0,1) (which is infinity). Thus, Cost(1,1)=Min (Cost$_{assign}$(S0→R0); ∞)=Cost$_{assign}$(S0→R0).

Referring now to cell (1,1), where the OSR 108 determines whether an assign string operation can be performed in order to advance towards cell (2,2). The OSR 108 determines if there is an output string S1k (associated with the candidate string S1) that satisfies characteristics of a model string associated with the rank R1. Referring back to FIG. 5, 51 has two potential output strings S10 and S11. The output string S10 represents a modified candidate string S1 that satisfies the characteristics of the model M0. Similarly the output string S11 represents a modified candidate string S1 that satisfies the characteristics of the model string M1. Referring back to FIG. 3A, which represents the association of the model strings and the ranks, it is determined that the rank R1 is only associated with the model M1. Therefore, only an output string that satisfies the characteristics of model M1 can be assigned to rank R1. Combining the information of FIG. 3A and FIG. 5, OSR 108 determines that there is an output string S11 (associated with model M1) that can be assigned to the rank R1. Therefore the path (1,1) to (2,2) is possible and the cost of proceeding from cell (1,1) to cell (2,2) with an assign string operation is calculated. The cost of moving from cell (1,1) to cell (2,2) with an assign string operation is Cost(1,1)+Cost$_{assign}$(S1→R1). In some embodiments, the Cost$_{assign}$(S1→R1) is determined based on the minimum edit cost between S1 and M1. For example, Cost$_{assign}$(S1→R1)=D(S1,M1), where D(S1,M1) is the minimum edit cost of transforming S1 into output string S11 to satisfy the characteristics of model M1.

At cell (2,2), OSR 108 determines the minimum assignation cost Cost(2,2). Cost (2,2) is the minimum between the costs of performing an assign operation (providing from cell (1,1) and the cost of a delete operation providing from cell (1,2) (which is infinity). Thus, Cost(2,2)=Min [(Cost(1,1)+Cost$_{assign}$(S1→R1)); ∞]=Cost(1,1)+Cost$_{assign}$(S1→R1).

Figure 8A:
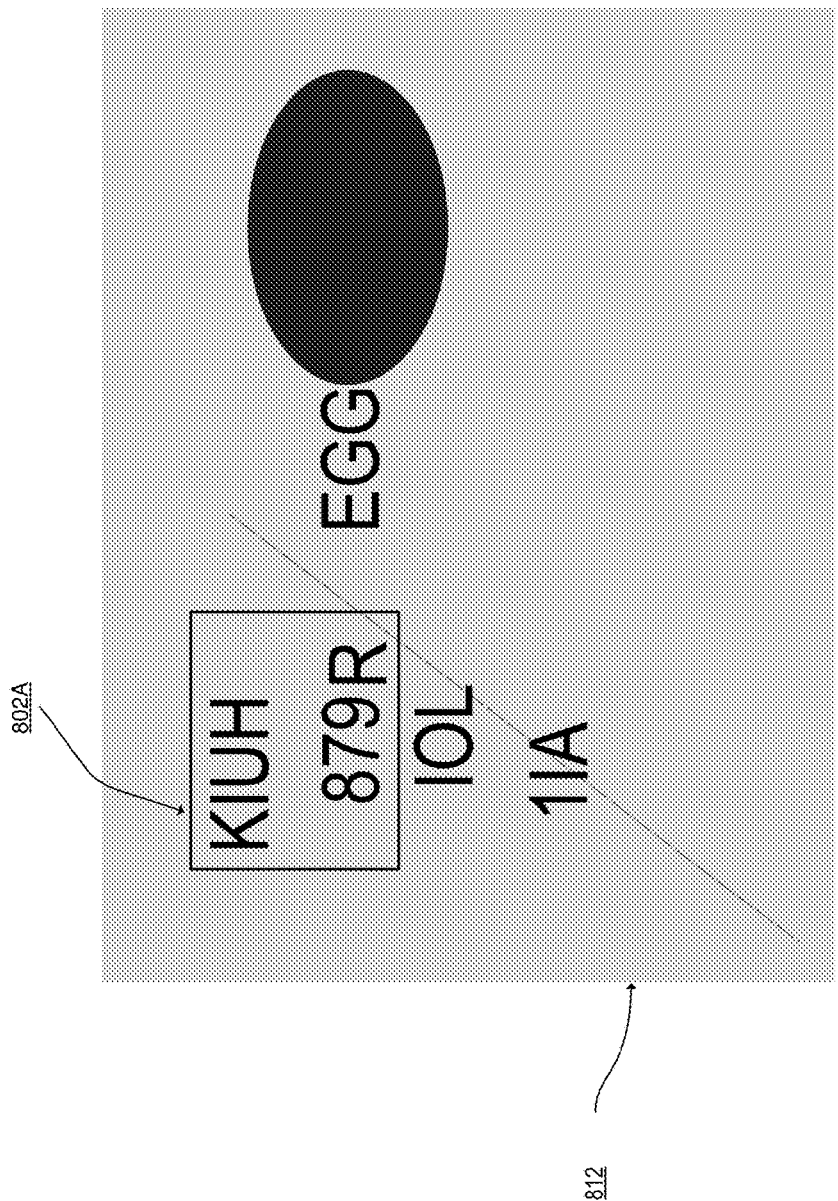
FIG. 8A illustrates a portion of image 112 including an illustration of a first solution for assigning the candidate strings to the set of ranks, in accordance with some embodiments.

In some embodiments, in addition to determining that there is an output string S1k that satisfies the characteristics of a model string that is associated with rank R1, the OSR 108 may further determine whether the candidate string S1 overlaps or not with another candidate string from the set of candidate string that are already assigned to the ranks prior to performing the assign string operation. In this example, string S11 does not overlap with string S00 (which was previously selected) and consequently it satisfies the non-overlap criteria. In addition, in some embodiments, the OSR 108 may determine if the candidate string S1 when selected with S0 fits within the bounding box defined for the string models. FIG. 8A illustrates a portion of image 112 including an illustration of a first solution for assigning the candidate strings to the set of ranks, in accordance with some embodiments. The box 802A includes the candidate string S0 and the candidate string S1 as assigned to rank R0 and rank R1 respectively. Given that string S1 satisfies all the selection criteria for the strings, the assign string operation is determined to be valid and the minimum assignment cost at cell (2,2):Cost (2,2), is defined and equals Cost(1,1)+$Cost_{assign}$(S1→R1). In some embodiments, the $Cost_{assign}$(S1→R1) is determined based on the minimum edit cost between S1 and M1. For example, $Cost_{assign}$(S1→R1)=D(S1,M1). Thus, Cost(2,2)=Cost (1,1)+$Cost_{assign}$(S1→R1)=D(S0,M0)+D(S1,M1).

Referring now to cell (0,1), OSR 108 determines whether another path can be followed from this cell. A delete operation is performed to proceed from cell (0,0) towards cell (1, 0). Given that the delete operation is performed prior to a string being assigned to the first rank R0, the cost of the delete operation is zero. The delete string operation results in discarding string S0 and not assigning it to any rank and therefore not selecting S0 to be part of a selected set of candidate strings. The process proceeds by calculating the minimum assignation cost at cell (2,1), Cost(2,1). The OSR 108 determines whether the string S1 can be assigned to rank R0. Similarly to the operations described with reference to string S0 to rank R0, it is determined that string S1 can be assigned to rank R0 (based upon the relationships of FIG. 3A and FIG. 5). Therefore the output string S10 and model M0 enable the string S1 to be assigned to rank R0. The cost for reaching cell (2,1) with an assign string operation equals $Cost_{assign}$(S1→R1) D(S1,M1). In some embodiments, in addition to determining that there is an output string S1k that satisfies the characteristics of a model string that is associated with rank R0, the OSR 108 may further determine whether the candidate string S1 overlaps or not with another candidate string from the set of candidate string that are already assigned to the ranks prior to performing the assign string operation. In this example, string S10 is the first string and no other string has already been assigned to a rank, and consequently it satisfies the non-overlap criteria. In addition, in some embodiments, the OSR 108 may determine if the candidate string S1 fits within the bounding box defined for the string models. Since the string S1 satisfies all criteria when assigned to rank R0, the cost of assigning the string S0 to rank R0 is defined and is equal to D(S1,M1).

In addition, in order to reach cell (2,1), another path can be used with a delete string operation of 51 for proceeding from cell (1,1) to cell (2,1). The cost of reaching the cell (2,1) from cell (1,1) is Cost(1,1)+$Cost_{delete}$(S1). The $Cost_{delete}$(S1)=1−$Cost_{assign}$(S1→R1)=1−D(S1,M1). Thus, the cost to reach cell (2,1) from (1,1)=D(S0,M0)+1−D(S1,M1). Referring back to cell (2,1), the minimum assignation cost Cost(2,1) at cell (2,1) is the minimum between the edit costs for reaching the cell (2,1) with an assign operation from cell (1,1) and a delete string operation from cell (1,1). Therefore Cost(2,1)=Min [D(S1,M1); D(S0,M0)+1−D(S1,M1)]. In the illustrated example, the Cost(2,1) will be equal to D(S1,M1).

Figure 8B:
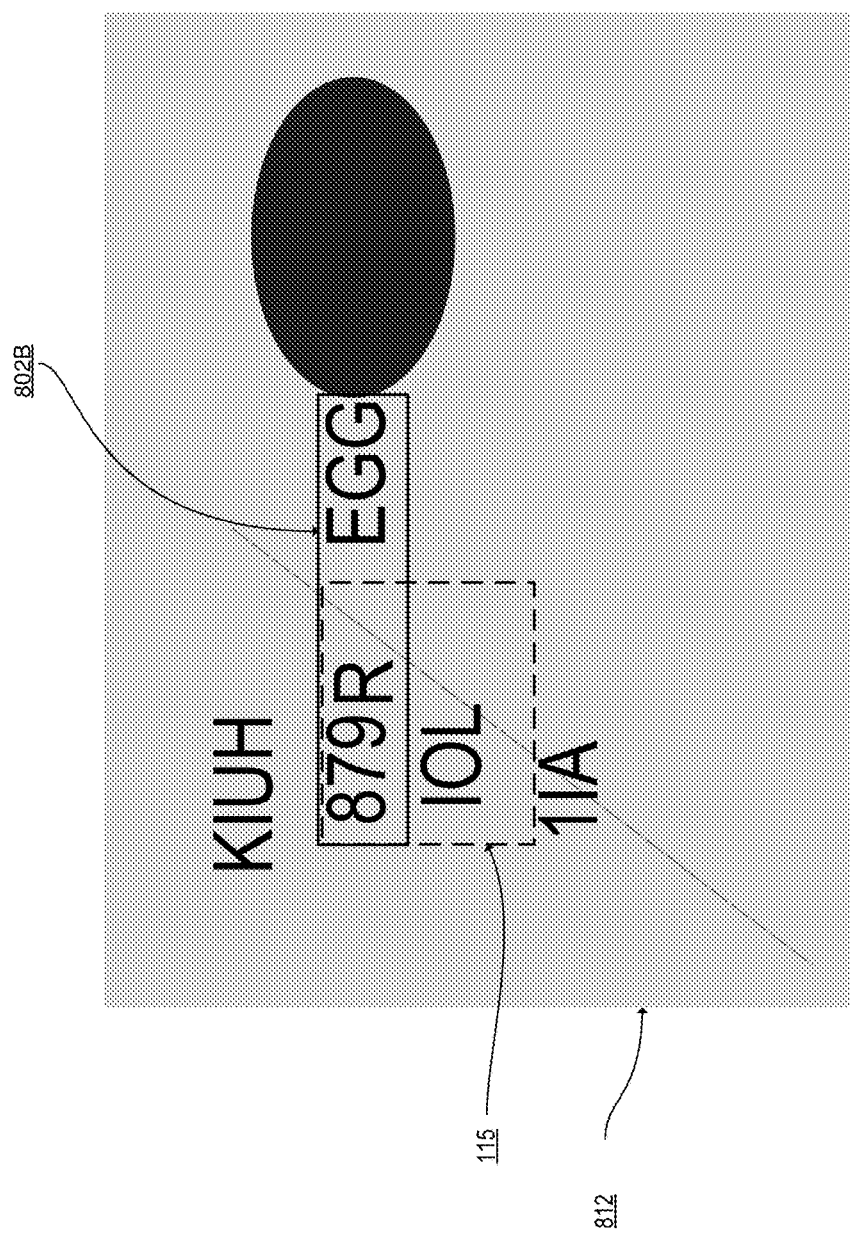
FIG. 8B illustrates a portion of image 112 including an illustration of a second solution for assigning the candidate strings to the set of ranks, in accordance with some embodiments.

At cell (2,1), the process continues with a determination of whether an assign string operation can be performed from cell (2,1) to cell (3,2). The OSR 108 determines if there is an output string S2k (associated with the candidate string S2) that satisfies characteristics of a model string associated with the rank R1. Referring back to FIG. 5, S2 has a single potential output string S21. The output string S21 represents a modified candidate string S2 that satisfies the characteristics of the model M1. In contrast to string S1 or string S0, string S2 cannot be modified to obtain an output string that corresponds to the model string M0. Therefore S2 has a single associated output string S21 with an associated minimum edit cost D(S2, M1). Referring back to FIG. 3A, it is determined that the rank R1 is only associated with the model M1. Combing the information of FIG. 3A and FIG. 5, OSR 108 determines that there is an output string S21 (associated with model M1) that can be assigned to the rank R1. Therefore the path (2,1)→(3,2) is possible and a cost for reaching cell (3,2) with an assign string operation can be calculated. The cost for reaching cell (3,2) with an assign string operation is the sum of Cost(2,1) and the $Cost_{assign}$(S2→R1). In some embodiments, the $Cost_{assign}$(S2→R1) is determined based on the minimum edit cost between S2 and M1. For example, $Cost_{assign}$(S2→R1) D(S2,M1). However, in order to determine if the assign string S2 to rank R1 is valid, the OSR 108 may further determine whether the string S2 when selected in addition to string S1 would fit within the bounding box defined for the model strings. FIG. 8B illustrates a portion of image 112 including an illustration of a second solution for assigning the candidate strings to the set of ranks, in accordance with some embodiments. The box 802B includes the candidate string Si and the candidate string S2 as assigned to rank R0 and rank R1 respectively.

As illustrated in FIG. 8B, in contrast to the first solution S0,S1, the second solution including string S1,S2 does not fit within the bounding box 115 that was defined for the model strings M0-M1. In these embodiments, the OSR 108 determines that when S2 is assigned to rank R1, the solution S1,S2 does not satisfy all the selection criteria set up for the model strings M0M1 and it updates the cost of proceeding from cell (2,1) to cell (3,2) with an assign string operation to be "not defined" instead of being equal to Cost(2,2)+$Cost_{assign}$(S2→R1), as indicated above.

At cell (3,2), OSR 108 determines the minimum assignation cost Cost(3,2). Cost (3,2) is the minimum between the costs of proceeding from cell (2,1) with an assign string operation providing from cell (2,1) (which is not defined (e.g., infinity)) and the cost of proceeding from cell (2,2) with a delete string operation. Thus, Cost(3,2)=Min[(Cost (2,2)+$Cost_{delete}$(S2)); ∞]=Cost(2,2)+$Cost_{delete}$(S2). Given that the delete operation is performed after the last rank R1 is reached, $Cost_{delete}$(S2)=0. Therefore Cost (3,2)=Cost(2,2).

Referring now to cell (3,1), the minimum assignation cost, Cost(3,1), is the minimum between the costs of proceeding from cell (2,1) with a delete string operation providing from cell (2,1) and the cost of proceeding from cell (2,1) with an assign string operation. The cost of proceeding from cell (2,0) to cell (3,1) with an assign operation is $Cost_{assign}$(S2→R0). However this operation is considered invalid as S2 does not converge towards a model (M0) that is associated with rank R0. Therefore none of S2 cannot be assigned to the rank R0 and the $Cost_{assign}$(S2→R0) is not defined (e.g., it is infinite). Alternatively, the cost of proceeding from cell (2,1) to cell (3,1) is Cost(2,1)+$Cost_{delete}$(S2). $Cost_{delete}$(S2)=1−$Cost_{assign}$(S2→R1). Given that $Cost_{assign}$(S2→R1) is not defined, $Cost_{delete}$(S2) is 0. Therefore, the cost of proceeding from cell (2,1) to cell (3,1) is equal to Cost(2,1). Thus, the minimum assignation cost at cell (3,1), Cost(3,1)=Min [∞; Cost(2,1)]=Cost(2,1).

At cell (3,1), the process continues with a determination of whether an assign string operation can be performed from cell (3,1) to cell (4,2). The OSR 108 determines if there is an output string S3k (associated with the candidate string S3) that satisfies characteristics of a model string associated with the rank R1. Referring back to FIG. 5, S3 has a single potential output string S31. The output string S31 represents a modified candidate string S3 that satisfies the characteristics of the model M1. S3 has a single associated output string S31 with an associated minimum edit cost D(S3, M1). Combining the information of FIG. 3A and FIG. 5, OSR 108 determines that there is an output string S31 (associated with model M1) that can be assigned to the rank R1. Therefore the path (3,1)→(4,2) is possible and a cost for reaching cell (4,2) with an assign operation is defined. The cost of moving from cell (3,1) to cell (4,2) with an assign string operation is Cost(3,1)+$Cost_{assign}$(S3→R1). In some embodiments, the $Cost_{assign}$(S3→R1) is determined based on the minimum edit cost between S3 and M1. For example, $Cost_{assign}$(S3→R1)=D(S3,M1), where D(S3,M1) is the minimum edit cost of transforming S3 into output string S31 to satisfy the characteristics of model M1.

Figure 8C:
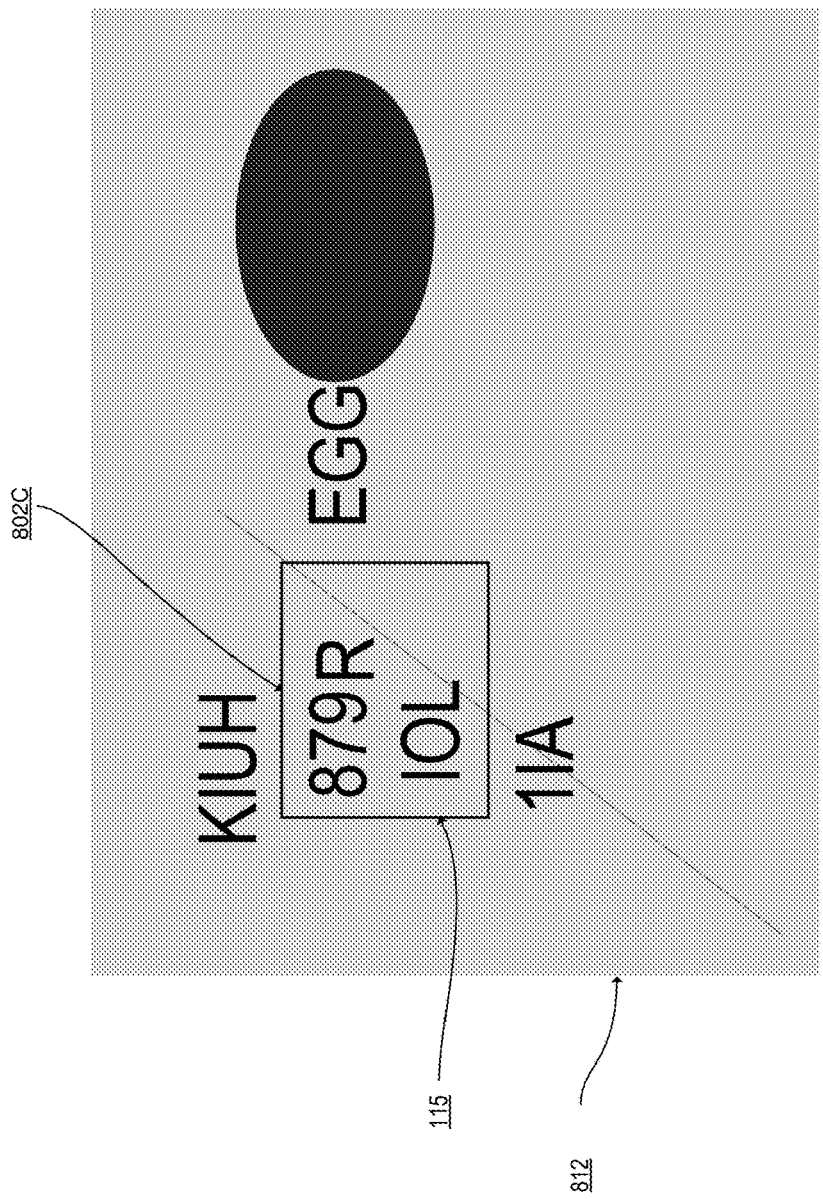
FIG. 8C illustrates a portion of image 112 including an illustration of a third solution for assigning the candidate strings to the set of ranks, in accordance with some embodiments.

In some embodiments, in addition to determining that there is an output string S3k that satisfies the characteristics of a model string that is associated with rank R1, the OSR 108 may further determine whether the candidate string S3 overlaps or not with another candidate string from the set of candidate string that are already assigned to the ranks prior to performing the assign string operation. In this example, string S3 does not overlap with string S1 and therefore the overlap condition is satisfied. In addition, in some embodiments, the OSR 108 may determine if the candidate string S3 fits within a bounding box defined for the string models associated with the set of ranks. FIG. 8C illustrates a portion of image 112 including an illustration of a third solution for assigning the candidate strings to the set of ranks, in accordance with some embodiments. As illustrated in FIG. 8C, similarly to the first solution S0,S1, the third solution including string S1,S3 fits within the bounding box 115 that was defined for the model strings M0-M1. Given that string S3 satisfies all the selection criteria for the strings, the assign string operation is determined to be valid and the cost of this operations is $Cost_{assign}$(S3→R1)=D(S3,M1).

At cell (4,2), OSR 108 determines the minimum assignation cost: Cost(4,2). Cost (4,2) is the minimum between the costs of performing an assign operation (providing from cell (3,1) and the cost of a delete operation providing from cell (3,2). Thus, Cost(4,2)=Min[(Cost(3,1)+$Cost_{assign}$(S3→R1)); (Cost(3,2)+$Cost_{delete}$(S3))]. Further, $Cost_{delete}$(S3)=0, and Cost(3,2)=Cost(2,2), Cost(3,1)=Cost(2,1)=D(S1,M0), and $Cost_{assign}$(S3→R1)=D(S3,M1). Given that the assignation costs are dependent on the minimum edit costs calculated between the candidate strings and the model strings, the candidate strings which have the smallest minimum edit costs (in other the candidate strings that are more similar to the model strings associated with the ranks) are selected as the subset of strings to be assigned to the ranks R0-R1. In fact, given that the minimum edit costs between two strings (e.g., D(Si, Mj)) are an indication of the disparities between the strings, and that model M0 is a better match to string S1 than model M1, Cost(4,2)=Cost(3,1)+$Cost_{assign}$(S3→R1)=D(S1,M0)+D(S3,M1).

A delete operation is then performed to move from cell (4,2) to cell (5,2). The delete operation is assigned a zero cost and therefore Cost(5,2)=Cost(4,2)=D(S1,M0)+D(S3,M1).

The solutions described above represent a subset of the paths explored within the dynamic programming array 700. For example, other paths can be explored when the cell (3,1) is reached. a delete operation can be performed, followed with an assign operation from cell (4,1) to cell (5,1) to assign S4 to R1. However this solution is considered invalid as a solution including the candidate string S1 and the candidate string S4 would not fit within the bounding box 115. In addition other paths can be explored by attempting to assign either one of S2, S3, or S4 to rank R0. However these paths are considered invalid as none of these candidate strings converge towards a model (M0) that is associated with rank R0. Therefore none of S2, S3, S4 can be assigned to the rank R0.

Once the various paths have been explored and the minimum assignation costs calculated for the cells of the dynamic programming array 700, the minimum assignation cost that enables assignation of the strings to the ranks R0-R1 is then determined, Cost(5,2). Once the minimum edit cost is computed, the solution of which string is associated to which rank is returned. In some embodiments, this is performed by determining the set of edit operations (e.g., assign string operation or delete string operation) corresponding to the minimum assignation cost, performing the set of edit operations (if any) on the set of strings to obtain a subset of strings, and returning the subset of strings in the order corresponding to the ranks. In an embodiment, the determination of a set of edit operations corresponding to the minimum assignation cost comprises backtracking through the dynamic programming array. In the example of FIG. 7, backtracking through the dynamic programming array from cell (5,2) towards cell (0,0) results in the following set of operations performed on the set of strings: delete(S0), assign (S1→R0), delete(S2), assign(S3→R1), and delete (S4).

In the embodiments described above, the operations defined to be performed on a set of strings (assign string and delete string operations), the costs associated with each operation, and the conditions to be satisfied for each operation (e.g., no overlap, fit within a bounding box, satisfy a model associated with a rank) enable the identification from a set of strings extracted in an image of a subset of strings that satisfy characteristics of a model scene.

The operations in flow diagrams of FIG. 9A-B will be described with reference to the exemplary embodiments of FIGS. 1-8C. However, it should be understood that the operations of the flow diagrams can be performed by embodiments of the invention other than those discussed with reference to FIGS. 1-8C, and the embodiments of the invention discussed with reference to FIGS. 1-8C can perform operations different than those discussed with reference to the flow diagrams of FIGS. 9A-B.

Figure 9A:
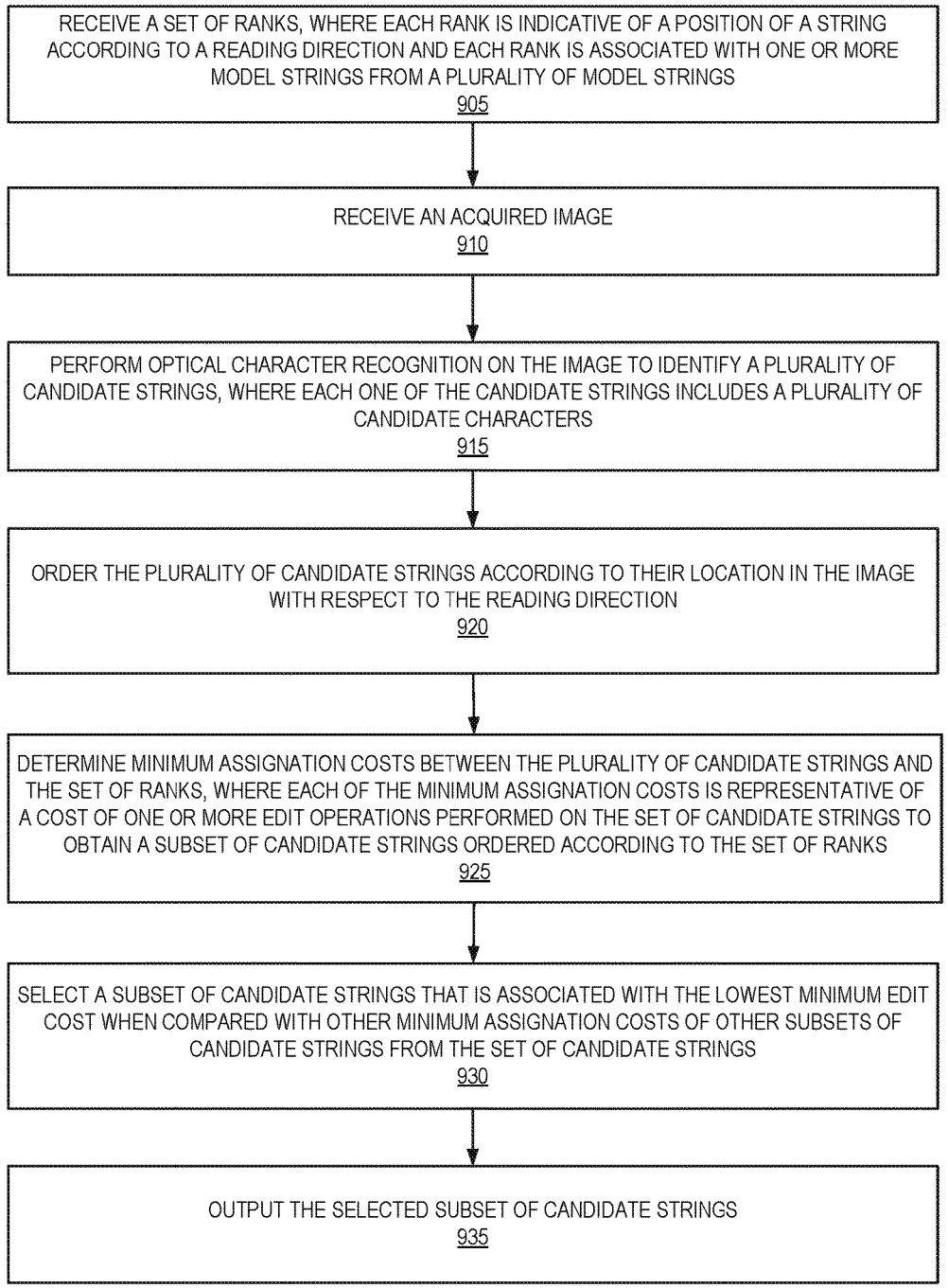
FIG. 9A illustrates a flow diagram of exemplary operations for identifying strings in an image in accordance with some embodiments.

FIG. 9A illustrates a flow diagram of exemplary operations for identifying strings in an image in accordance with some embodiments. At operation 905, a set of ranks (e.g., R0,R1) is received at the optical string recognizer 108. Each rank is indicative of a position of a string according to a reading direction and is associated with one or more model strings (in FIG. 3A, R0 is associated with string model M0 and R1 is associated with string model M1) from a plurality of model strings. In one embodiment, a model string is defined as a sequence of predefined characters and spaces from a given alphabet (e.g., the user may be interested in identifying the following sequences of characters "983 8K7," as illustrated in FIG. 2A (model string M2), or any other set of successive predefined characters). One possible alphabet is the set of characters A-Z and numerals 0-9, though other alphabets can also be used. Alternatively in some embodiments, the model string may be a template for an output string as opposed to successive predefined characters. In some embodiments, the ranks and model strings can be entered by a user through a graphical user interface (GUI). The user can be prompted to define the model strings, the set of ranks, and any other information for defining the strings to be located in an image (e.g., bounding box including the model strings). In some embodiments, the user may be prompted to enter one or more model string for each rank by typing the characters on a keyboard or selecting a set of characters through a drop down menu. In other embodiments, the user may input an image (similar to model scene 1). In some embodiments, instead of being input to the optical string recognizer by a user, the parameters can be preconfigured (e.g., hardcoded) in the optical string recognizer 108.

Flow then moves to operation 910, at which an acquired image (e.g., image 112) is received. At operation 915, optical character recognition is performed on the image to identify a plurality of candidate strings (e.g., candidate strings S0-S5). Each one of the candidate strings includes a multiple candidate characters. OCR can be performed according to various techniques. Typically a first step of extracting candidate characters that match model characters is performed, followed with a second step of segmenting the candidate characters into multiple strings. Flow then moves to operation 920, at which the OSR 108 orders the plurality of candidate strings according to their location in the image with respect to the reading direction. The ordering operation causes each candidate string to obtain a respective candidate position defined with respect to the reading direction. The reading order is the same as the one used for defining the ranks and the characteristics of model scene 1. In some embodiments, when the candidate strings are extracted they are already ordered in the reading order 202 as the image 112 may be processed in that order and this ordering operation can be skipped. In other embodiments an additional operation can be performed to order the candidate strings resulting in the ordered candidate strings 114 (S0-S5).

In some embodiments, each one of the extracted candidate string is then analyzed to determine if it satisfies the characteristics of one or more model strings. For example, for each strings Si, a similarity measure can be calculated between a candidate string and each one of the model strings. The similarity measure is a measure of the similarities or alternatively of the disparities between the two strings. In some embodiments, the minimum edit cost (e.g., an edit distance, a Levensthein distance, weighed edit distance, or any other type of distance that computes the differences between two strings) for transforming a candidate string into each one of the model strings M0, M1 is computed. In some embodiments, determining a minimum edit cost of transforming the candidate string to satisfy a model string includes determining "set costs" of performing various sets (or combinations) of edit operations on the candidate string and determining the minimum cost using the set costs. In some embodiments, determining a minimum edit cost is performed according to a dynamic programming algorithm.

Flow then moves to operation 925, at which minimum assignation costs between the plurality of candidate strings and the set of ranks are determined. Each of the minimum assignation costs is representative of a cost of one or more edit operations performed on the plurality of candidate strings to obtain a subset of candidate strings ordered according to the set of ranks. In some embodiments, to obtain the subset of candidate strings includes obtaining an assignation of each one of the candidate strings from the subset to a respective one from the set of ranks, and each candidate string from the subset assigned to a rank satisfies characteristics of at least one of the model strings associated with the rank. FIG. 9B illustrates a flow diagram of exemplary operations for determining minimum assignation costs between multiple candidate strings and a set of ranks, in accordance with some embodiments. In some embodiments, determining minimum assignation costs between candidate strings and a set of ranks, includes determining (operation 940) a cost of performing an assign string operation on a first candidate string (e.g., S0) to a first rank (R0) causing the candidate string to be included in the subset of candidate string.

In some embodiments performing an assign operation of the first candidate string to the first rank includes operation 945, at which the OSR 108 determines that the first candidate string does not overlap with a second candidate string from the subset of candidate strings. In some embodiments, flow moves to operation 950, at which the OSR 108 determines that the first rank is associated with a first model string, and that the candidate string satisfies characteristics of the first model string. Flow then moves to operation 955, at which OSR 108, determines that the first candidate string fits within a bounding box defined for the string models associated with the set of ranks.

Referring back to operation 925, in some embodiments determining minimum assignation costs further includes determining (operation 960) a cost of performing a delete string operation of a first candidate string that results in discarding the first candidate string from the subset of candidate strings.

Referring back to FIG. 9A, when the minimum assignation costs are determined, flow moves to operation 930, at which the OSR 108 selects a subset of candidate strings that is associated with the lowest minimum assignation cost when compared with other minimum assignation costs of other subsets of candidate strings from the plurality of candidate strings. At operation 935, the selected subset of candidate strings is output.

In some embodiments, determining minimum assignation costs is performed by determining costs of cells of a dynamic programming array, where a cost of proceeding from a first cell to an adjacent cell is defined based upon the operation performed for moving from the cell to the adjacent cell (e.g., performing a delete string operation or a assign string operation) as described with reference to FIG. 7.

Once the minimum assignation costs are calculated for the cells of the dynamic programming array, the minimum assignation cost that enables assignation of the strings to the ranks is then determined. The solution indicating which string is associated to which rank is returned. In some embodiments, this is performed by determining the set of edit operations (e.g., assign string operation or delete string operation) corresponding to the minimum assignation cost, performing the set of edit operations (if any) on the set of strings to obtain a subset of strings, and returning the subset of strings in the order corresponding to the ranks. In an embodiment, the determination of a set of edit operations corresponding to the minimum assignation cost comprises backtracking through the dynamic programming array.

The embodiments of the present invention describe methods and systems for reading multiple strings in an image based upon positions of model strings relative to one another (ranks). In the embodiments described above, the operations defined to be performed on a set of strings (assign string and delete string operations), the costs associated with each operation, and the conditions to be satisfied for each operation (e.g., no overlap, fit within a bounding box, satisfy a model associated with a rank) enable the identification from a set of strings extracted in an image of a subset of strings that satisfy characteristics of a model scene.

The embodiments leverage information extracted from the image 112 (recognition scores of candidate character, minimum edit costs between the candidate strings and model strings, position of the characters, and position of the strings within the image) within the process of assignation of the candidate strings to ranks. In some embodiments, the computation of minimum assignation costs is performed according to a dynamic programming process enabling the efficient execution of the assignment process. The embodiments enable the filtering of texts by discarding strings that even if they match one or more model strings do not satisfy other characteristics of the desired output strings (e.g., overlap of characters, size of the bounding box, etc.).

Architecture

Figure 10:
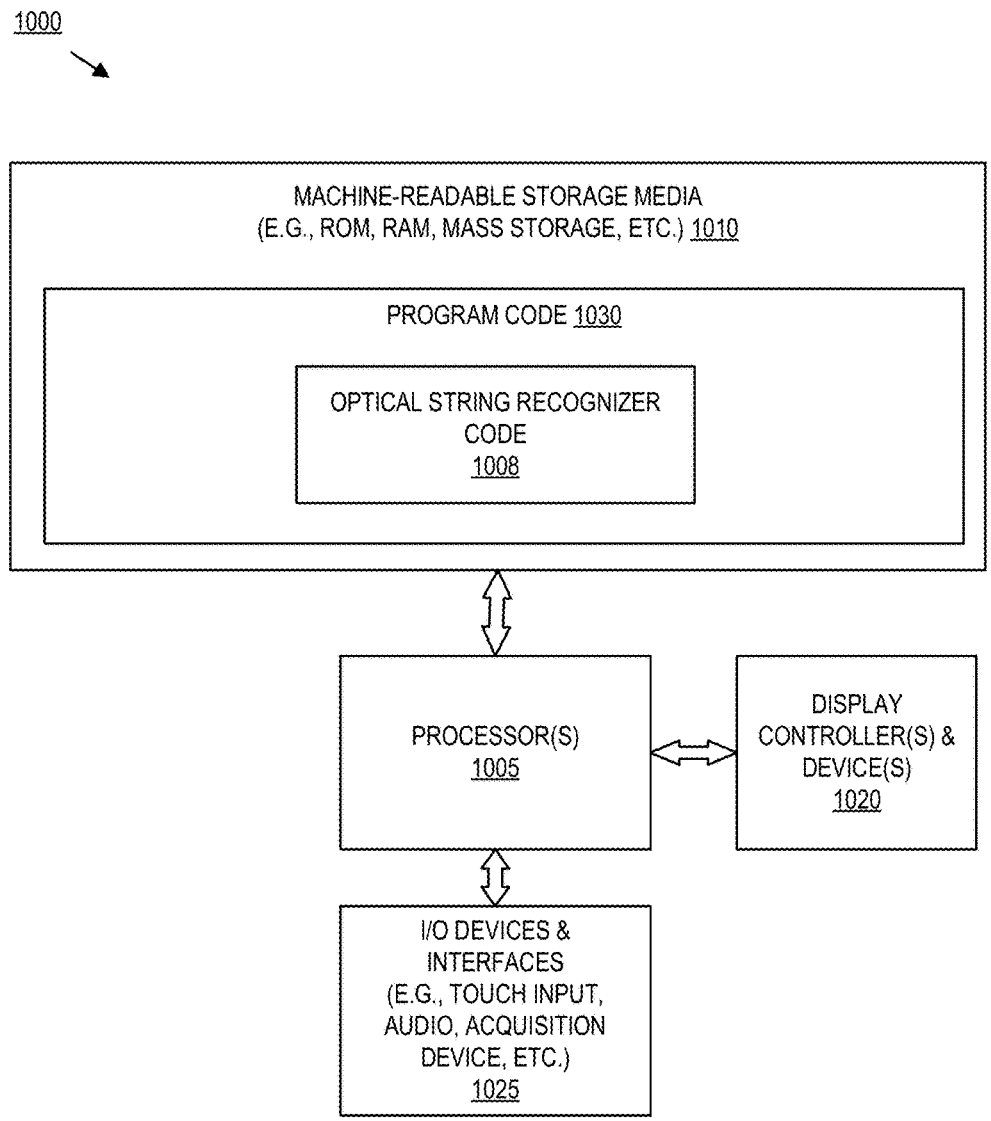
FIG. 10 is a block diagram illustrating an exemplary data processing system that may be used in some embodiments.

FIG. 10 illustrates a block diagram for an exemplary data processing system 1000 that may be used in some embodiments. Data processing system 1000 includes one or more processors 1005 and connected system components (e.g., multiple connected chips). Alternatively, the data processing system 1000 is a system on a chip or Field-Programmable gate array. One or more such data processing systems 1000 may be utilized to implement the functionality of the optical string recognizer 108 as illustrated in FIGS. 1-9B.

The data processing system 1000 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 1010 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 1005. For example, the depicted machine readable storage media 1010 may store program code 1030 that, when executed by the processor(s) 1005, causes the data processing system 1000 to perform efficient and accurate identify strings in an image. For example, the program code 1030 may include optical string recognizer code 1008, which when executed by the processor(s) 1005, causes the data processing system 1000 to perform the operations described with reference to FIGS. 1-9B.

Thus, an electronic device (e.g., a computer or an FPGA) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 1000 may also include a display controller and display device 1020 to provide a visual user interface for the user, e.g., GUI elements or windows. The visual user interface may be used to enable a user to input parameters to the optical string recognizer 108, to view results of the string identification, or any other task.

The data processing system 1000 also includes one or more input or output ("I/O") devices and interfaces 1025, which are provided to allow a user to provide input to, receive output from, and otherwise transfer data to and from the system. These I/O devices 1025 may include a mouse, keypad, keyboard, a touch panel or a multi-touch input panel, camera, frame grabber, optical scanner, an audio input/output subsystem (which may include a microphone and/or a speaker for, for example, playing back music or other audio, receiving voice instructions to be executed by the processor(s) 1005, playing audio notifications, etc.), other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1000.

The I/O devices and interfaces 1025 may also include a connector for a dock or a connector for a USB interface, FireWire, Thunderbolt, Ethernet, etc., to connect the system 1000 with another device, external component, or a network. Exemplary I/O devices and interfaces 1025 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1000 with another device, external component, or a network and receive stored instructions, data, tokens, etc. It will be appreciated that one or more buses may be used to interconnect the various components shown in FIG. 10.

It will be appreciated that additional components, not shown, may also be part of the system 1000, and, in certain embodiments, fewer components than that shown in FIG. 10 may also be used in a data processing system 1000. For example, in some embodiments the data processing system 1000 may include or be coupled with an image acquisition device for acquiring images.

While the embodiments are described with the optical string recognizer 108 performing the OCR mechanism, in other embodiment, the OCR can be performed externally to the optical string recognizer 108. In these embodiments, the optical string recognizer 108 is operative to receive a set of one or more candidate strings (where the characters machine-encoded text) which were extracted from an image as a result of OCR. In other embodiments, the optical string recognizer (OSR) 108 is operative to perform at least the segmentation stage of the OCR. In these embodiments, the OSR 108 receives a set of characters (in machine-encoded text) as a result of a character extraction within the image 212 and segments the characters into one or more strings based on the stringness criteria.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. For example, while the flow diagrams in the figures show a particular order of operations performed by certain embodiments of the invention, it should be understood that such order is exemplary. One having ordinary skill in the art would recognize that variations can be made to the flow diagrams without departing from the broader spirit and scope of the invention as set forth in the following claims (e.g., alternative embodiments may perform the operations in a different order, combine certain operations, overlap certain operations, etc.).

Some portions of the preceding detailed descriptions have been presented in terms of algorithms and symbolic representations of transactions on data bits within a computer and memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

What is claimed is:

1. A method of identifying a plurality of strings in an image, the method comprising:
   receiving a set of ranks, wherein each rank is indicative of a position of a string according to a reading direction and is associated with one or more model strings from a plurality of model strings;
   receiving an image;
   performing optical character recognition on the image to identify a plurality of candidate strings, wherein each one of the candidate strings includes a plurality of candidate characters;
   ordering the plurality of candidate strings according to their location in the image with respect to the reading direction;
   determining minimum assignation costs between the plurality of candidate strings and the set of ranks, wherein each of the minimum assignation costs is representative of a cost of one or more edit operations performed on the plurality of candidate strings to obtain a subset of candidate strings ordered according to the set of ranks;
   selecting a subset of candidate strings that is associated with the lowest minimum assignation cost when compared with other minimum assignation costs of other subsets of candidate strings from the plurality of candidate strings; and
   outputting the selected subset of candidate strings.

2. The method of claim 1, wherein to obtain the subset of candidate strings includes obtaining an assignation of each one of the candidate strings from the subset to a respective one from the set of ranks, and each candidate string from the subset assigned to a rank satisfies characteristics of at least one of the model strings associated with the rank.

3. The method of claim 1, wherein determining minimum assignation costs includes:
   defining a set of allowable operations that can be performed on the plurality of candidate strings to obtain the subset of candidate strings and determining cost associated with each allowable edit operation.

4. The method of claim 1, wherein determining minimum assignation costs includes:
   determining a cost of performing an assign string operation on a first candidate string, wherein the assign string operation causes the first candidate string to be assigned to a first rank from the set of ranks and to be included in the subset of candidate strings.

5. The method of claim 4, wherein performing the assign string operation includes:
   determining that the first candidate string does not overlap with a second candidate string from the subset of candidate strings.

6. The method of claim 4, wherein performing the assign string operation includes:
   determining that the first rank is associated with a first model string, and that the first candidate string satisfies characteristics of the first model string.

7. The method of claim 4, wherein performing the assign string operation includes:
   determining that the first candidate string fits within a bounding box defined for the string models associated with the set of ranks.

8. The method of claim 1, wherein determining minimum assignation costs includes:
   determining a cost of performing a delete string operation of a first candidate string that results in discarding the first candidate string from the subset of candidate strings.

9. The method of claim 1, wherein each one of the plurality of model strings is a template string having an associated plurality of character positions, each character position being associated with a character set defining a set of one or more allowable model characters for a respective character position in a candidate string.

10. An image processing device comprising:
a non-transitory computer readable medium to store instructions; and
a processor coupled with the non-transitory computer readable medium to process the stored instructions to:
receive a set of ranks, wherein each rank is indicative of a position of a string according to a reading direction and is associated with one or more model strings from a plurality of model strings,
receive an image,
perform optical character recognition on the image to identify a plurality of candidate strings, wherein each one of the candidate strings includes a plurality of candidate characters,
order the plurality of candidate strings according to their location in the image with respect to the reading direction,
determine minimum assignation costs between the plurality of candidate strings and the set of ranks, wherein each of the minimum assignation costs is representative of a cost of one or more edit operations performed on the plurality of candidate strings to obtain a subset of candidate strings ordered according to the set of ranks,
select a subset of candidate strings that is associated with the lowest minimum assignation cost when compared with other minimum assignation costs of other subsets of candidate strings from the plurality of candidate strings, and
output the selected subset of candidate strings.

11. The image processing device of claim 10, wherein to obtain the subset of candidate strings includes obtaining an assignation of each one of the candidate strings from the subset to a respective one from the set of ranks, and each candidate string from the subset assigned to a rank satisfies characteristics of at least one of the model strings associated with the rank.

12. The image processing device of claim 10, wherein to determine minimum assignation costs includes to:
define a set of allowable operations that can be performed on the plurality of candidate strings to obtain the subset of candidate strings and determine cost associated with each allowable edit operation.

13. The image processing device of claim 10, wherein to determine minimum assignation costs includes to:
determine a cost of performing an assign string operation on a first candidate string, wherein the assign string operation causes the first candidate string to be assigned to a first rank from the set of ranks and to be included in the subset of candidate strings.

14. The image processing device of claim 13, wherein to perform an assign string operation includes:
to determine that the first candidate string does not overlap with a second candidate string from the subset of candidate strings.

15. The image processing device of claim 13, wherein to perform an assign string operation includes:
to determine that the first rank is associated with a first model string, and that the first candidate string satisfies characteristics of the first model string.

16. The image processing device of claim 13, wherein to perform an assign string operation includes:

to determine that the first candidate string fits within a bounding box defined for the string models associated with the set of ranks.

17. The image processing device of claim 10, wherein to determine minimum assignation costs includes:
to determine a cost of performing a delete string operation of a first candidate string that results in discarding the first candidate string from the subset of candidate strings.

18. The image processing device of claim 10, wherein each one of the plurality of model strings is a template string having an associated plurality of character positions, each character position being associated with a character set defining a set of one or more allowable model characters for a respective character position in a candidate string.

19. A non-transitory computer readable storage medium that provides instructions, which when executed by a processor, cause said processor to perform operations comprising:
receiving a set of ranks, wherein each rank is indicative of a position of a string according to a reading direction and is associated with one or more model strings from a plurality of model strings;
receiving an image;
performing optical character recognition on the image to identify a plurality of candidate strings, wherein each one of the candidate strings includes a plurality of candidate characters;
ordering the plurality of candidate strings according to their location in the image with respect to the reading direction;
determining minimum assignation costs between the plurality of candidate strings and the set of ranks, wherein each of the minimum assignation costs is representative of a cost of one or more edit operations performed on the plurality of candidate strings to obtain a subset of candidate strings ordered according to the set of ranks;
selecting a subset of candidate strings that is associated with the lowest minimum assignation cost when compared with other minimum assignation costs of other subsets of candidate strings from the plurality of candidate strings; and
outputting the selected subset of candidate strings.

20. The non-transitory computer readable storage medium of claim 19, wherein to obtain the subset of candidate strings includes obtaining an assignation of each one of the candidate strings to a respective one from the set of ranks, and each candidate string from the subset assigned to a rank satisfies characteristics of at least one of the model strings associated with the rank.

21. The non-transitory computer readable storage medium of claim 19, wherein determining minimum assignation costs includes:
defining a set of allowable operations that can be performed on the plurality of candidate strings to obtain the subset of candidate strings and determining cost associated with each allowable edit operation.

22. The non-transitory computer readable storage medium of claim 19, wherein determining minimum assignation costs includes:
determining a cost of performing an assign string operation on a first candidate string, wherein the assign string operation causes the first candidate string to be assigned to a first rank from the set of ranks and to be included in the subset of candidate strings.

23. The non-transitory computer readable storage medium of claim 22, wherein performing the assign string operation includes:
  determining that the first candidate string does not overlap with a second candidate string from the subset of candidate strings.

24. The non-transitory computer readable storage medium of claim 22, wherein performing the assign string operation includes:
  determining that the first rank is associated with a first model string, and that the first candidate string satisfies characteristics of the first model string.

25. The non-transitory computer readable storage medium of claim 22, wherein performing the assign string operation includes:
  determining that the first candidate string fits within a bounding box defined for the string models associated with the set of ranks.

26. The non-transitory computer readable storage medium of claim 19, wherein determining minimum assignation costs includes:
  determining a cost of performing a delete string operation of a first candidate string that results in discarding the first candidate string from the subset of candidate strings.

27. The non-transitory computer readable storage medium of claim 19, wherein each one of the plurality of model strings is a template string having an associated plurality of character positions, each character position being associated with a character set defining a set of one or more allowable model characters for a respective character position in a candidate string.

* * * * *

UNITED STATES PATENT AND TRADEMARK OFFICE
CERTIFICATE OF CORRECTION

PATENT NO. : 10,217,020 B1
APPLICATION NO. : 15/383325
DATED : February 26, 2019
INVENTOR(S) : Rivard It is certified that error appears in the above--identified patent and that said Letters Patent is hereby corrected as shown below:

On the Title Page

Please replace the (57) Abstract with the following amended Abstract:
A method and system of identifying a plurality of strings in an image are described. A set of ranks and an image are received. Optical character recognition is performed on the image to identify candidate strings. The candidate strings are ordered according to their location in the image with respect to a reading direction. Minimum assignation costs between the plurality of candidate strings and the set of ranks are determined. Each of the minimum assignation costs is representative of a cost of one or more edit operations performed on the plurality of candidate strings to obtain a subset of candidate strings ordered according to the set of ranks. A subset of candidate strings that is associated with the lowest minimum assignation cost when compared with other minimum assignation costs of other subsets of candidate strings from the plurality of candidate strings is selected and output.

In the Specification

In Column 1, Line 14, delete "is" and insert --to--.

In Column 1, Line 29, delete "searches" and insert --searched--.

In Column 1, Line 52, delete "Further" and insert --Further,--.

In Column 1, Line 57, delete "need" and insert --needs--.

In Column 3, Line 32, delete "Further" and insert --Further,--.

In Column 3, Line 37, delete "need" and insert --needs--.

In Column 3, Line 45, delete "system" and insert --systems--.

In Column 3, Line 46, delete "need" and insert --needs--.

Signed and Sealed this
Twenty-eighth Day of May, 2019

Andrei Iancu
*Director of the United States Patent and Trademark Office*

CERTIFICATE OF CORRECTION (continued)
U.S. Pat. No. 10,217,020 B1

In Column 4, Line 55, delete "sequences" and insert --sequence--.

In Column 5, Line 10, delete "letter" and insert --letters--.

In Column 6, Line 2, delete "string" and insert --strings--.

In Column 6, Line 32-33, delete "model strings" and insert --ranks--.

In Column 6, Line 62, delete "R1" and insert --R2--.

In Column 7, Line 3-4, delete "associated" and insert --associations--.

In Column 7, Line 9, delete "M0" and insert --M1--.

In Column 7, Line 10, delete "," after embodiments.

In Column 7, Line 16, delete "strings" and insert --string--.

In Column 7, Line 27, delete "65335" and insert --65535--.

In Column 7, Line 45, delete "order" and insert --orders--.

In Column 7, Line 46, delete "(3)" and insert --(3),--.

In Column 8, Line 10, delete "match" and insert --matches--.

In Column 8, Line 52-53, delete "recognitions" and insert --recognition--.

In Column 8, Line 67, delete "operations" and insert --operation--.

In Column 9, Line 58, delete "costs" and insert --costs,--.

In Column 9, Line 62, delete "string" and insert --strings--.

In Column 9, Line 64, delete "or" and insert --of--.

In Column 10, Line 16, delete "S1" and insert --M1--.

In Column 10, Line 49, before "for each pair" insert --D(Si,Mi)--.

In Column 10, Line 49, delete "Sij" and insert --(Si, Mi)--.

In Column 10, Line 55, delete "embodiments," and insert --embodiments--.

In Column 10, Line 56, delete "cost" and insert --costs--.

CERTIFICATE OF CORRECTION (continued)
U.S. Pat. No. 10,217,020 B1

In Column 11, Line 29, delete "candidate output" and insert --output strings,--.

In Column 11, Line 41, delete "in".

In Column 11, Line 44, delete "Ri" and insert --Rj--.

In Column 11, Line 57, delete "or" and insert --of--.

In Column 12, Line 36, insert --D-- before --(Si,Mk)--.

In Column 12, Line 40, delete "strings" and insert --string--.

In Column 12, Line 42, delete "strings" and insert --string--.

In Column 12, Line 43, delete "M1" and insert --M2--.

In Column 12, Line 44, insert --a-- before --cost--.

In Column 12, Line 52, insert --a-- before --valid--.

In Column 12, Line 53, delete "multiple".

In Column 12, Line 62, delete "embodiments" and insert --embodiments,--.

In Column 13, Line 16, insert --R-- before --(j+1))--.

In Column 13, Line 38, delete "S0-S1" and insert --R0-R1--.

In Column 13, Line 38, delete "The" and insert --In the--.

In Column 14, Line 13, delete "string" and insert --strings--.

In Column 14, Line 26, after operation, delete "(".

In Column 14, Line 30, delete "where".

In Column 14, Line 60, after operation, delete "(".

In Column 15, Line 23, delete "(0,1)" and insert --(1,0)--.

In Column 15, Line 40, delete "R1" and insert --R0--.

In Column 15, Line 40, delete "M1" and insert --M0--.

In Column 15, Line 45, delete "string" and insert --strings--.

CERTIFICATE OF CORRECTION (continued)
U.S. Pat. No. 10,217,020 B1

In Column 15, Line 53, delete "S0" and insert --S1--.

In Column 15, Line 54, delete "M1" and insert --M0--.

In Column 15, Line 65, delete "M1" and insert --M0--.

In Column 15, Line 67, delete "M1" and insert --M0--.

In Column 16, Line 15, delete "Combing" and insert --Combining--.

In Column 16, Line 42, delete "2" and insert --1--.

In Column 16, Line 57, delete "1" and insert --0--.

In Column 16, Line 61, delete "none of".

In Column 17, Line 31, delete "string" and insert --strings--.

In Column 17, Line 43, delete "string" and insert --strings--.

In Column 17, Line 60, before other, insert --words--.

In Column 18, Line 08, delete "reached." and insert --reached:--.

In Column 18, Line 09, delete "1" and insert --2--.

In Column 18, Line 10, delete "However" and insert --However,--.

In Column 18, Line 10, delete "addition" and insert --addition,--.

In Column 18, Line 14, delete "However" and insert --However,--.

In Column 18, Line 17, delete "Therefore" and insert --Therefore,--.

In Column 18, Line 48, before flow diagrams, insert --the--.

In Column 18, Line 48, delete "FIG" and insert --FIGS--.

In Column 19, Line 01, delete "sequences" and insert --sequence--.

In Column 19, Line 14, delete "string" and insert --strings--.

In Column 19, Line 26, delete "a".

In Column 19, Line 28, delete "Typically" and insert --Typically,--.

CERTIFICATE OF CORRECTION (continued)
U.S. Pat. No. 10,217,020 B1

In Column 19, Line 42, delete "embodiments" and insert --embodiments,--.

In Column 19, Line 46, delete "string" and insert --strings--.

In Column 19, Line 48, delete "strings" and insert --string--.

In Column 20, Line 20, delete "string" and insert --strings--.

In Column 20, Line 21, delete "embodiments" and insert --embodiments,--.

In Column 20, Line 30, delete "108," and insert --108--.

In Column 21, Line 13, delete "character" and insert --characters--.

In Column 21, Line 51, delete "identify" and insert --identification of--.

In Column 22, Line 58, delete "embodiment" and insert --embodiments--.

In Column 22, Line 61-62, after "characters" insert --are in--.

In Column 23, Line 01, delete "212" and insert --112--.